(12) United States Patent
Malsch et al.

(10) Patent No.: US 12,493,020 B2
(45) Date of Patent: Dec. 9, 2025

(54) FLOW CELL FOR SAMPLE SEPARATION APPARATUS WITH PROTECTION AGAINST ELECTROMAGNETIC STRAY RADIATION

(71) Applicant: Agilent Technologies, Inc., Santa Clara, CA (US)

(72) Inventors: Daniell Malsch, Rauenberg (DE); Christoph Keppler, Karlsruhe (DE); Bertram Beigel, Karlsruhe (DE); Karsten Kraiczek, Waldbronn (DE)

(73) Assignee: Agilent Technologies, Inc., Santa Clara, CA (US)

( * ) Notice: Subject to any disclaimer, the term of this patent is extended or adjusted under 35 U.S.C. 154(b) by 380 days.

(21) Appl. No.: 17/953,246

(22) Filed: Sep. 26, 2022

(65) Prior Publication Data

US 2023/0100871 A1 Mar. 30, 2023

(30) Foreign Application Priority Data

Sep. 29, 2021 (GB) ...................................... 2113925

(51) Int. Cl.
*G01N 30/74* (2006.01)
*G01N 30/02* (2006.01)
*G01N 30/14* (2006.01)
*G01N 30/38* (2006.01)

(52) U.S. Cl.
CPC ............. *G01N 30/74* (2013.01); *G01N 30/14* (2013.01); *G01N 30/38* (2013.01); *G01N 2030/027* (2013.01)

(58) Field of Classification Search
CPC .... G01N 21/0303; G01N 30/74; G01N 30/14; G01N 30/38; G01N 2030/027; G01N 21/05
See application file for complete search history.

(56) References Cited

U.S. PATENT DOCUMENTS

| | | | | |
|---|---|---|---|---|
| 3,333,107 A | * | 7/1967 | Hubbard | ................. G01N 21/05 250/573 |
| 4,730,922 A | * | 3/1988 | Bach | ....................... G01N 21/17 356/73 |
| 5,439,578 A | * | 8/1995 | Dovichi | ............ G01N 27/44782 356/417 |

(Continued)

FOREIGN PATENT DOCUMENTS

| | | | | |
|---|---|---|---|---|
| DE | 3103476 C2 | * | 1/1992 | |
| DE | 4308202 A1 | * | 9/1994 | ................ G01J 3/02 |

(Continued)

*Primary Examiner* — Octavia Hollington

(57) ABSTRACT

A flow cell, for detecting a fluidic sample separated by a sample separation apparatus, includes a cuvette, a flow channel formed at least partially in the cuvette and configured to enable a flow of the separated fluidic sample through the flow channel, an electromagnetic radiation inlet at which an excitation electromagnetic radiation beam is couplable into the cuvette, and an electromagnetic radiation outlet at which an emission electromagnetic radiation beam, generated by an interaction between the excitation electromagnetic radiation beam and the separated fluidic sample, is couplable out of the cuvette. A geometry of the cuvette is configured so that at least one point at the excitation backside surface of the cuvette is outside of a direct field of view of the electromagnetic radiation outlet.

20 Claims, 6 Drawing Sheets

(56) References Cited

U.S. PATENT DOCUMENTS

| | | | |
|---|---|---|---|
| 5,599,503 A | 2/1997 | Manz et al. | |
| 6,307,204 B1 | 10/2001 | Kanomata et al. | |
| 7,948,619 B2 * | 5/2011 | Huemer | G01N 21/05 356/246 |
| 8,086,083 B2 * | 12/2011 | Mueller | G01N 21/0303 385/125 |
| 9,347,870 B2 * | 5/2016 | Vogl | G01N 21/0303 |
| 9,500,588 B2 | 11/2016 | Dicesare et al. | |
| 10,094,770 B2 * | 10/2018 | Ehring | G01N 21/05 |
| 10,436,704 B2 * | 10/2019 | Haghgooie | B01L 3/5027 |
| 2009/0268195 A1 | 10/2009 | Ilkov | |
| 2010/0290041 A1 | 11/2010 | Graham et al. | |
| 2016/0238517 A1 | 8/2016 | Furuya et al. | |
| 2019/0107487 A1 | 4/2019 | Rahmlow et al. | |

FOREIGN PATENT DOCUMENTS

| | | |
|---|---|---|
| EP | 0655128 B1 * | 3/1990 |
| EP | 0422448 A2 | 4/1991 |
| EP | 1577012 A1 | 9/2005 |
| JP | S60207038 A | 10/1985 |
| JP | H01109245 A | 4/1989 |
| JP | H0612946 U | 2/1994 |
| WO | 02071029 A1 | 9/2002 |

\* cited by examiner

FLOW CELL FOR SAMPLE SEPARATION APPARATUS WITH PROTECTION AGAINST ELECTROMAGNETIC STRAY RADIATION

RELATED APPLICATIONS

This application claims the benefit of the filing date of the British Patent Application No. 2113925.8, filed Sep. 29, 2021, the entire contents of which are incorporated herein by reference.

TECHNICAL FIELD

The present disclosure relates to flow cells for and methods of detecting a fluidic sample separated by a sample separation apparatus, and a sample separation apparatus.

BACKGROUND

In liquid chromatography, a fluidic sample and an eluent (liquid mobile phase) may be pumped through conduits and a separation unit such as a column in which separation of sample components takes place. The column may comprise a material which is capable of separating different components of the fluidic sample. The separation unit may be connected to other fluidic members (like a sampler or an injector, a detector) by conduits. Before the fluidic sample is introduced into a separation path between a fluid drive unit (in particular a high pressure pump) and the separation unit, a predefined amount of fluidic sample shall be intaken from a sample source (such as a sample container) via an injection needle into a sample loop by a corresponding movement of a piston within a metering device. Thereafter, an injector valve is switched so as to introduce the intaken amount of fluidic sample from the sample loop of a metering path into the separation path between the fluid drive unit and the separation unit for subsequent separation. As a result, the fluidic sample is injected into the mobile phase, such as a solvent or a solvent composition.

After separation, the separated fluidic sample may be detected in a detector with a flow cell. The separated fluidic sample flows through the flow cell while being optically detected by the detector.

However, precise detection may be difficult due to undesired stray radiation which may increase a background and/or may overlay artifacts to a detection signal.

SUMMARY

There may be a need to enable detection of a separated fluidic sample in a simple and accurate way. Flow cells for and methods of detecting a fluidic sample separated by a sample separation apparatus, and a sample separation apparatus are described in the following.

According to an exemplary embodiment of a first aspect of the present disclosure, a flow cell for detecting a fluidic sample separated by a sample separation apparatus is provided, wherein the flow cell comprises a cuvette, a flow channel formed at least partially in the cuvette and configured to enable a flow of the separated fluidic sample through the flow channel, an electromagnetic radiation inlet at which an excitation electromagnetic radiation beam is couplable into the cuvette, and an electromagnetic radiation outlet at which an emission electromagnetic radiation beam, generated by an interaction between the excitation electromagnetic radiation beam and the separated fluidic sample, is couplable out of the cuvette, wherein (in particular a geometry of) the cuvette is configured (in particular shaped) so that at least one point at the excitation backside surface of the cuvette is outside of a direct field of view of the electromagnetic radiation outlet.

According to another exemplary embodiment of the first aspect of the disclosure, a method of detecting a fluidic sample separated by a sample separation apparatus is provided, wherein the method comprises enabling a flow of the separated fluidic sample through a flow channel formed at least partially in a cuvette, coupling an excitation electromagnetic radiation beam into the cuvette via an electromagnetic radiation inlet, coupling an emission electromagnetic radiation beam, generated by an interaction between the excitation electromagnetic radiation beam and the separated fluidic sample, out of the cuvette via an electromagnetic radiation outlet, and configuring (in particular shaping and arranging) (in particular a geometry of) the cuvette so that at least one point at the excitation backside surface of the cuvette is outside of a direct field of view of the electromagnetic radiation outlet.

According to an exemplary embodiment of a second aspect of the present disclosure, a flow cell for detecting a fluidic sample separated by a sample separation apparatus is provided, wherein the flow cell comprises a cuvette, a flow channel formed at least partially in the cuvette and configured to enable a flow of the separated fluidic sample through the flow channel, an electromagnetic radiation inlet at which an excitation electromagnetic radiation beam is couplable into the cuvette, and an electromagnetic radiation outlet at which an emission electromagnetic radiation beam, generated by an interaction between the excitation electromagnetic radiation beam and the separated fluidic sample, is couplable out of the cuvette, wherein (in particular a geometry of) the cuvette is configured (in particular shaped) so that at least one edge at the emission backside surface of the cuvette is outside of a direct field of view of the electromagnetic radiation outlet.

According to another exemplary embodiment of the second aspect of the disclosure, a method of detecting a fluidic sample separated by a sample separation apparatus is provided, wherein the method comprises enabling a flow of the separated fluidic sample through a flow channel formed at least partially in a cuvette, coupling an excitation electromagnetic radiation beam into the cuvette via an electromagnetic radiation inlet, coupling an emission electromagnetic radiation beam, generated by an interaction between the excitation electromagnetic radiation beam and the separated fluidic sample, out of the cuvette via an electromagnetic radiation outlet, and configuring (in particular shaping and arranging) (in particular a geometry of) the cuvette so that at least one edge at the emission backside surface of the cuvette is outside of a direct field of view of the electromagnetic radiation outlet.

According to still another exemplary embodiment of the first aspect and/or the second aspect, a sample separation apparatus for separating a fluidic sample is provided, wherein the sample separation apparatus comprises a fluid drive for driving a mobile phase and the fluidic sample when injected in the mobile phase, a sample separation unit for separating the fluidic sample in the mobile phase, and a detector with a flow cell having the above-mentioned features for detecting the separated fluidic sample.

In the context of this application, the term "sample separation apparatus" may particularly denote any apparatus which is capable of separating different fractions of a fluidic sample by applying a certain separation technique, in particular liquid chromatography.

In the context of this application, the term "fluidic sample" may particularly denote any liquid and/or gaseous medium, optionally including also solid particles, which is to be analyzed. Such a fluidic sample may comprise a plurality of fractions of molecules or particles which shall be separated, for instance small mass molecules or large mass biomolecules such as proteins. Separation of a fluidic sample into fractions may involve a certain separation criterion (such as mass, volume, chemical properties, etc.) according to which a separation is carried out.

In the context of this application, the term "mobile phase" may particularly denote any liquid and/or gaseous medium which may serve as fluidic carrier of the fluidic sample during separation. A mobile phase may be a solvent or a solvent composition (for instance composed of water and an organic solvent such as ethanol or acetonitrile). In an isocratic separation mode of a liquid chromatography apparatus, the mobile phase may have a constant composition over time. In a gradient mode, however, the composition of the mobile phase may be changed over time, in particular to desorb fractions of the fluidic sample which have previously been adsorbed to a stationary phase of a separation unit.

In the context of the present application, the term "fluid drive" may particularly denote an entity capable of driving a fluid (i.e. a liquid and/or a gas, optionally comprising solid particles), in particular the fluidic sample and/or the mobile phase. For instance, the fluid drive may be a pump (for instance embodied as piston pump or peristaltic pump) or another source of high pressure. For instance, the fluid drive may be a high-pressure pump, for example capable of driving a fluid with a pressure of at least 100 bar, in particular at least 500 bar. Additionally or alternatively, a motion of the mobile phase can also be triggered by an electrostatic force.

In the context of the present application, the term "sample separation unit" may particularly denote a fluidic member through which a fluidic sample is transferred and which is configured so that, upon conducting the fluidic sample through the separation unit, the fluidic sample will be separated into different groups of molecules or particles. An example for a separation unit is a liquid chromatography column which is capable of trapping or retarding and selectively releasing different fractions of the fluidic sample.

In the context of the present application, the term "flow cell" may particularly denote an optical cell used in a detector (in particular in a photometer-based detector) through which a fluidic sample may be passed for detection by optical radiation. More specifically, a flow cell may comprise an at least partially transparent body with a hollow interior space through which a fluidic sample may flow, wherein the fluidic sample may be optically detected while passing the hollow interior space.

In the context of the present application, the term "cuvette" may particularly denote an at least partially optically transparent member made of one or more bodies and being configured for enabling a flow of a fluidic sample through the cuvette while simultaneously enabling electromagnetic radiation to interact with the fluidic sample flowing through the cuvette for detection purposes. In particular, a cuvette may be a straight-sided clear container for holding liquid samples in a spectrophotometer or other detector. In the context of the present application, the geometry of the cuvette may be defined by one or more of: a length in the direction of the excitation electromagnetic radiation beam, a width perpendicular to the direction of the excitation electromagnetic radiation beam, and a position of the electromagnetic radiation outlet relative to a position of the electromagnetic radiation inlet and/or a position of the flow channel.

In the context of the present application, the term "flow channel" may particularly denote a defined flow volume enabling a fluidic sample to flow in a spatially defined and confined manner in an interior of a cuvette of a flow cell. For instance, the flow channel may be circumferentially closed to thereby define a flowing direction. Along the flow channel, the fluidic sample may flow in a straight way, while an inlet and an outlet of the flow channel may be coupled via further fluidic structures to the flow channel.

In the context of the present application, the term "excitation electromagnetic radiation beam" may particularly denote electromagnetic radiation (in particular in the visible, ultraviolet and/or infrared range of wavelengths) being provided for interacting with a fluidic sample in the flow channel so as to bring the fluidic sample or part thereof to an excited state, for instance to an excited energy level. For instance, the electromagnetic radiation may provide energy to trigger an excitation of a luminescent chemical group or label of the fluidic sample so that the fluidic sample subsequently emits luminescence (in particular fluorescence or phosphorescence) radiation. It is also possible that the excitation electromagnetic radiation beam triggers generation of secondary electromagnetic radiation in sample by Raman scattering.

In the context of the present application, the term "emission electromagnetic radiation beam, generated by an interaction between the excitation electromagnetic radiation beam and the separated fluidic sample" may particularly denote electromagnetic radiation (in particular in the visible, ultraviolet and/or infrared range of wavelengths) which is created in response to the irradiation of the fluidic sample with the excitation electromagnetic radiation beam. For instance, the emission electromagnetic radiation beam may be a beam of luminescence (in particular fluorescence or phosphorescence) radiation.

In the context of the present application, the term "direct field of view of the electromagnetic radiation outlet" may particularly denote a spatial range within a cuvette of a flow cell from which electromagnetic radiation can propagate directly, i.e. without reflection and/or refraction at an interface of the cuvette, to the electromagnetic radiation outlet and from there to a sensitive region of a radiation-sensitive detection element.

In the context of the present application, the term "excitation frontside surface" may particularly denote an exterior (or outer) surface of the cuvette in which an electromagnetic radiation inlet for coupling excitation electromagnetic radiation into the cuvette may be formed.

In the context of the present application, the term "excitation backside surface" may particularly denote an exterior (or outer) surface of the cuvette opposing the excitation frontside surface (in which an electromagnetic radiation inlet for coupling excitation electromagnetic radiation into the cuvette may be formed).

In the context of the present application, the term "emission frontside surface" may particularly denote an exterior (or outer) surface of the cuvette in which an electromagnetic radiation outlet for outcoupling emission electromagnetic radiation out of the cuvette may be formed.

In the context of the present application, the term "emission backside surface" may particularly denote an exterior (or outer) surface of the cuvette opposing the emission frontside surface (in which an electromagnetic radiation outlet for outcoupling emission electromagnetic radiation out of the cuvette may be formed).

According to an exemplary embodiment of the first aspect of the disclosure, a flow cell used for detecting a separated fluidic sample by coupling an excitation electromagnetic radiation beam into the flow cell for triggering the separated fluidic sample to provide an emission electromagnetic radiation beam is provided. In such a flow cell, detection of the emission electromagnetic radiation beam for characterizing the separated fluidic sample may be performed with reduced artifacts and thereby in a highly accurate way. Advantageously, this may be achieved by ensuring that one or several positions or even a continuous area at the excitation backside surface of the cuvette is or are outside of a direct field of view of an electromagnetic radiation outlet through which an emission electromagnetic radiation beam propagates for being subsequently detected by a detection optics. This may ensure that an undesired propagation of stray radiation through the electromagnetic radiation outlet is strongly suppressed. In particular, this may be achieved by positioning, shaping, proportioning and/or dimensioning the (geometry of the) cuvette in such a way that the mentioned geometric condition is fulfilled. Consequently, propagation of undesired and unspecific stray light through the electronic radiation outlet may be significantly reduced. As a result, the portion of meaningful emission electromagnetic radiation, being characteristically influenced by the fluidic sample, in the detected electromagnetic radiation can be increased. This reduces the background radiation and increases the precision of the detection and therefore of the sample separation.

According to an exemplary embodiment of the second aspect of the disclosure, a flow cell the aforementioned type may have a cuvette with a design (geometry) ensuring that one or both opposing edges at the emission backside surface of the cuvette is or are not within a direct field of view of the electromagnetic radiation outlet through which the emission electromagnetic radiation beam propagates for being subsequently detected. In particular, this may be achieved by positioning, shaping, proportioning and/or dimensioning the cuvette in such a way that a parasitic beam path of sample-unspecific stray radiation towards an electromagnetic radiation outlet is inhibited. Descriptively speaking, indirect beam paths of parasitic light are less efficient and therefore less disturbing than parasitic light within a direct field of view of the electromagnetic radiation outlet. As a result, stray light reducing the signal-to-noise ratio of the detector and originating from an edge at the emission backside surface may be inhibited from reaching the detector along a direct path. Descriptively speaking, this may suppress the conventional undesired phenomena of glowing edges in a detection signal. Thus, noise may be suppressed while a meaningful signal in form of emission electromagnetic radiation being a fingerprint of the fluidic sample may be relatively enhanced. Consequently, an accuracy of the detection may be improved.

Exemplary embodiments relating to the first aspect may be implemented independently of the second aspect of the disclosure. Exemplary embodiments relating to the second aspect may be implemented independently of the first aspect of the disclosure. Another exemplary embodiment, however, combines exemplary embodiments relating to the first aspect and the second aspect of the disclosure.

In the following, further embodiments of the flow cells, the sample separation apparatus, and the methods will be explained.

In an embodiment, the (geometry of the) cuvette is shaped so that at least one edge at the emission backside surface of the cuvette is outside of a direct field of view of the electromagnetic radiation outlet. This may further reduce the amount of stray light and may in particular prevent glowing edges in a detector signal resulting from the one or more edges. In an embodiment, both opposing edges at the emission backside surface of the cuvette may be located outside of the direct field of view.

In an embodiment, the (geometry of the) cuvette is shaped so that at least one point at the excitation backside surface of the cuvette is outside of a direct field of view of the electromagnetic radiation outlet. In an embodiment, a partial area or even the entire area between two opposing edges at the excitation backside surface may be located apart from the direct field of view of the electromagnetic radiation outlet, which further increases the signal-to-noise ratio.

In an embodiment, the (geometry of the) cuvette is shaped so that at least one edge at the excitation backside surface of the cuvette is outside of the direct field of view of the electromagnetic radiation outlet. A glowing edge in a detector signal resulting from the edge may then be prevented in a detection signal. Reduction of such kind of artifacts may further increase the sensitivity of the detection.

In an embodiment, the (geometry of the) cuvette is shaped so that an edge between the excitation backside surface and the emission backside surface of the cuvette is outside of the direct field of view of the electromagnetic radiation outlet. In particular the described edge has been conventionally a source of significant stray light glowing in a detector signal in an undesired way. Configuring the cuvette design so that this glowing edge is invisible in the detector signal may further increase the accuracy.

In an embodiment, the (geometry of the) cuvette is shaped so that at least part of an area, in particular an entire area, of the excitation backside surface of the cuvette is outside of the direct field of view of the electromagnetic radiation outlet. This means in particular that electromagnetic radiation propagating to the mentioned area cannot propagate directly to the electromagnetic radiation outlet without reflections or refractions.

In an embodiment, the (geometry of the) cuvette is shaped so that an edge between the excitation frontside surface and the emission backside surface of the cuvette is outside of the direct field of view of the electromagnetic radiation outlet. Thus, also the edge may be taken out from sources of artifacts in a detector which may deteriorate the accuracy of a separation result.

In an embodiment, the (geometry of the) cuvette is shaped so that at least the part of the excitation electromagnetic radiation beam which is not refracted at an interface between the cuvette and the flow channel but propagates through the flow channel and further to the excitation backside surface does not impinge on an edge between the excitation backside surface and the emission frontside surface and/or does not impinge on an edge between the excitation backside surface and the emission backside surface. More specifically, the excitation electromagnetic radiation beam entering the cuvette through the electromagnetic radiation inlet may comprise a first portion which propagates through the flow channel towards the excitation backside surface without being reflected or refracted at interfaces with different refraction index. Furthermore, the excitation electromagnetic radiation beam entering the cuvette through the electromagnetic radiation inlet may comprise a second portion which propagates towards the flow channel and is refracted outwardly at an interface between cuvette material and medium in the flow channel. In the described embodiment, the direct first portion reaches the excitation backside surface only in a central portion thereof, and not at its edges. Highly advantageously, this avoids intense glowing edges with high intensity in the detection signal. However, the second portion will be split at the interface between cuvette and flow channel into a reflected part and a refracted part, so that the refracted part—which may also reach an edge at the excitation backside surface—will be significantly attenuated. Its disturbing impact on the detection signal is therefore relatively weak.

In an embodiment, excitation electromagnetic radiation propagating from the electromagnetic radiation inlet to the excitation backside surface and being reflected from the excitation backside surface backwards to the excitation frontside surface is disabled from reaching an edge between the excitation frontside surface and the emission backside surface. Hence, also secondary electromagnetic radiation which has already been reflected by the excitation backside surface may be prevented from contributing to an intensively glowing edge. This can also be achieved by a corresponding geometric design of the cuvette.

In an embodiment, the (geometry of the) cuvette is shaped so that excitation electromagnetic radiation reflected at at least one point or even a partial area at the excitation backside surface of the cuvette is outside of a direct field of view of the electromagnetic radiation outlet. For instance, such a reflected excitation electromagnetic radiation may be directed towards an emission backside surface, so that at least one additional attenuating reflection is necessary to direct such non-sample related electromagnetic radiation to the electromagnetic radiation outlet.

In an embodiment, the flow cell comprises an electromagnetic radiation absorber for absorbing substantially the entire electromagnetic radiation impinging on the excitation backside surface of the cuvette. For instance, such an electromagnetic radiation absorber may be made of black glass, more specifically of black silica glass. Such an electromagnetic radiation absorber may absorb for instance more than 99% of the excitation electromagnetic radiation which has entered the flow cell through the electromagnetic radiation inlet, has passed the flow chamber and propagates further up to the excitation backside surface. When being reflected there, such electromagnetic radiation may create stray rays reducing the signal-to-noise ratio in the detector. However, when the excitation backside surface is covered, partially or entirely, with the electromagnetic radiation absorber, this source of stray light may be strongly suppressed.

In an embodiment, the electromagnetic radiation absorber has substantially the same refractive index as the cuvette and additionally comprises electromagnetic radiation absorbing particles, in particular carbon particles. Highly advantageously, the transparent material of the cuvette and the transparent matrix material of the electromagnetic radiation absorber may be provided with the same refractive index, for instance may both be made of the same material, for instance silica glass. Highly advantageously, a reflective and refractive interface may thus be avoided between cuvette and electromagnetic radiation absorber. This suppresses further undesired optical artifacts in the detector. It has been surprisingly found that optically absorbing particles such as carbon in a matrix of silica glass keeps the refraction index of the material of the electromagnetic radiation absorber substantially unchanged as compared to transparent silica glass, while adding a strong radiation absorbing function. Further advantageously, all other surfaces of the cuvette apart from the excitation backside surface may be free of an electromagnetic radiation absorber.

In an embodiment, the shape and the dimension(s) of the cuvette are configured so that electromagnetic radiation is disabled from directly propagating from one, some or all edges of the cuvette to the electromagnetic radiation outlet. Thus, the design rules for designing the cuvette for suppressing undesired stray light as described above may be such that the shape and the dimensions of the cuvette as well as its proportions and its material may be matched for creating propagation trajectories of electromagnetic radiation in the cuvette which suppresses or even eliminates the above mentioned sources of stray light, which may be prevented from reaching the detector. Examples for such designs are shown in FIG. 2, FIG. 3, FIG. 5, FIG. 7, etc.

In an embodiment, the flow channel is fluidically coupled to an inlet channel for supplying separated fluidic sample to be detected and to an outlet channel for draining detected separated fluidic sample. While the flow channel may extend straight in one direction, both the inlet channel and the outlet channel may extend perpendicular to the flow channel.

In an embodiment, at least part of a surface of the inlet channel and/or the outlet channel is locally smoothed, in particular is a laser polished surface and/or a wet etched surface. Highly advantageously, smoothing the fluidic interface(s) between flow channel and inlet and/or outlet channel (s) may suppress scattering artifacts in these regions. Conventionally, such interfaces may show a significant roughness, as a result of their manufacturing process. By selectively smoothing the mentioned surface(s) so that the surface roughness is locally reduced in the mentioned surface(s), such parasitic diffuse scattering processes may be suppressed for improving accuracy of the detection signal.

In an embodiment, the cuvette is formed by a plurality of thermally bonded cuboid elements. By thermally bonding a plurality of cuvette elements with each other, a cuvette may be formed in a simple way with a flow channel in its interior being delimited between the various cuvette elements.

In an embodiment, the cuvette is configured as a substantial cuboid body with a substantially cuboid hollow interior volume constituting the flow channel. Such a geometry may be created with high precision and with low optical artifacts in a detector.

In an embodiment, the flow channel is arranged in the cuvette closer to the excitation frontside surface than to the excitation backside surface and/or closer to the emission frontside surface than to the emission backside surface. Descriptively speaking, the flow channel may be arranged apart from a center of the cuvette, for suppressing optical artifacts. Such an asymmetric flow channel design is shown for instance in FIG. 3, FIG. 5 and FIG. 7, see description below.

In an embodiment, the flow cell is configured so that a main propagation direction of the excitation electromagnetic radiation beam is substantially perpendicular to a main propagation direction of the emission electromagnetic radiation beam. Substantially, centers of excitation electromagnetic radiation and of emission electromagnetic radiation may be oriented perpendicular to each other, so that stray light originating from the excitation electromagnetic radiation can be prevented efficiently from entering the detector outlet.

In an embodiment, the electromagnetic radiation inlet is defined by an inlet slit at an excitation frontside surface of the cuvette and/or by an excitation monochromator optically coupled to the excitation frontside surface of the cuvette. Such a slit may be an optical opening defining a propagation entry of the excitation electromagnetic radiation into the cuvette. It is also possible to provide an excitation monochromator (for instance a diffraction grating) for selecting a wavelength or a narrow wavelength range from a broader wavelength range emitted by an electromagnetic radiation source. For instance, the slit may have a width which may be substantially identical to the width of the flow channel.

In an embodiment, the electromagnetic radiation outlet is defined by an emission monochromator optically coupled to the emission frontside surface of the cuvette. Thus, it is possible to provide an emission monochromator (for instance a diffraction grating) for selecting a wavelength or narrow wavelength range from a broader wavelength range from the emission electromagnetic radiation beam for detection. Other optical elements may be used as well for defining an outlet aperture, for instance an ellipsoidal mirror, a lens configuration, etc.

Embodiments may be implemented in conventionally available HPLC systems, such as the analytical Agilent 1290 Infinity II LC system or the Agilent 1290 Infinity II Preparative LC/MSD system (both provided by the applicant Agilent Technologies—see www.agilent.com).

One embodiment of a sample separation apparatus comprises a pump having a pump piston for reciprocation in a pump working chamber to compress liquid in the pump working chamber to a high pressure at which compressibility of the liquid becomes noticeable. This pump may be configured to know (by means of operator's input, notification from another module of the instrument or similar) or elsewise derive solvent properties.

The sample separation unit of the sample separation apparatus may comprise a chromatographic column (see for instance en.wikipedia.org/wiki/Column_chromatography) providing a stationary phase. The column may be a glass or steel tube (for instance with a diameter from 50 μm to 5 mm and a length of 1 cm to 1 m) or a microfluidic column (as disclosed for instance in EP 1577012 or the Agilent 1200 Series HPLC-Chip/MS System provided by the applicant Agilent Technologies). The individual components are retained by the stationary phase differently and at least partly separate from each other while they are propagating at different speeds through the column with the eluent. At the end of the column they elute one at a time or at least not entirely simultaneously. During the entire chromatography process the eluent may be also collected in a series of fractions. The stationary phase or adsorbent in column chromatography usually is a solid material. The most common stationary phase for column chromatography is silica gel, surface modified silica gel, followed by alumina. Cellulose powder has often been used in the past. Also possible are ion exchange chromatography, reversed-phase chromatography (RP), affinity chromatography or expanded bed adsorption (EBA). The stationary phases are usually finely ground powders or gels and/or are microporous for an increased surface.

The mobile phase (or eluent) can be a pure solvent or a mixture of different solvents (such as water and an organic solvent such as ACN, acetonitrile). It can be chosen for instance to adjust the retention of the compounds of interest and/or the amount of mobile phase to run the chromatography. The mobile phase can also be chosen so that the different compounds or fractions of the fluidic sample can be separated efficiently. The mobile phase may comprise an organic solvent like for instance methanol or acetonitrile, often diluted with water. For gradient operation water and organic is delivered in separate bottles, from which the gradient pump delivers a programmed blend to the system. Other commonly used solvents may be isopropanol, tetrahydrofuran (THF), hexane, ethanol and/or any combination thereof or any combination of these with aforementioned solvents.

A fluidic sample analyzed by a sample separation apparatus according to an exemplary embodiment of the disclosure may comprise but is not limited to any type of process liquid, natural sample like juice, body fluids like plasma or it may be the result of a reaction like from a fermentation broth.

The pressure, as generated by the fluid drive, in the mobile phase may range from 2-200 MPa (20 to 2000 bar), in particular 10-150 MPa (150 to 1500 bar), and more particularly 50-120 MPa (500 to 1200 bar).

The sample separation apparatus, for instance an HPLC system, may further comprise a detector for detecting separated compounds of the fluidic sample, a fractionating unit for outputting separated compounds of the fluidic sample, or any combination thereof. For example, a fluorescence detector may be implemented.

Embodiments of the disclosure can be partly or entirely embodied or supported by one or more suitable software programs, which can be stored on or otherwise provided by any kind of data carrier, and which might be executed in or by any suitable data processing unit. Software programs or routines can be applied in or by the control unit.

BRIEF DESCRIPTION OF DRAWINGS

Other objects and many of the attendant advantages of embodiments of the present disclosure will be readily appreciated and become better understood by reference to the following more detailed description of embodiments in connection with the accompanying drawings. Features that are substantially or functionally equal or similar will be referred to by the same reference signs.

Figure 1:
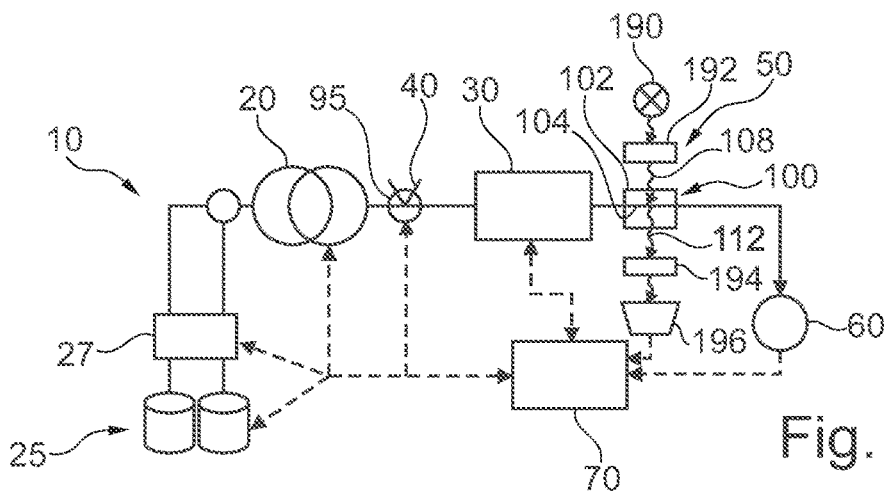
FIG. 1 shows a liquid sample separation apparatus in accordance with embodiments of the present disclosure, particularly used in high performance liquid chromatography (HPLC).

The illustrations in the drawings are schematic.

DETAILED DESCRIPTION

Before describing the figures in further detail, some basic considerations of the present disclosure will be summarized based on which exemplary embodiments have been developed.

Generally, design of a flow cell, in particular for a sample separation apparatus such as a liquid chromatography device, may be a very complex process of balancing requirements of fluidic dispersion, light throughput, emission light collection, autofluorescence (which can be influenced by material choices), straylight and manufacturing effort.

According to an exemplary embodiment of the disclosure, a detector flow cell, in particular of a sample separation apparatus may comprise a design of a cuvette with a flow channel therein which allows for a detection with high signal-to-noise ratio by inhibiting accuracy-limiting stray light from impinging on an electromagnetic radiation detecting element optically coupled to an electromagnetic radiation outlet of the flow cell. More specifically, sample-nonspecific excitation electromagnetic radiation introduced in the flow cell for triggering emission of sample-specific emission electromagnetic radiation by the sample (for instance fluorescence radiation) may be prevented at least partially from propagating towards the electromagnetic radiation outlet. For example, this may be accomplished by configuring (in particular designing a form factor by shaping, proportioning and dimensioning) the cuvette so that at least one point at an excitation backside surface of the cuvette is outside of a direct field of view of the electromagnetic radiation outlet. Additionally or alternatively, stray light may be suppressed by configuring (in particular designing a form factor by shaping, proportioning and dimensioning) the cuvette so that at least one edge at an emission backside surface of the cuvette is outside of the direct field of view. Descriptively speaking, the excitation backside surface of the cuvette may be a main surface thereof opposing an excitation frontside surface at which an electromagnetic radiation inlet for supplying excitation electromagnetic radiation is formed. Furthermore, the emission backside surface of the cuvette may be a main surface thereof opposing an emission frontside surface at which an electromagnetic radiation outlet for outcoupling emission electromagnetic radiation out of the flow cell and towards a detecting unit is formed. With the described geometric design rules of the cuvette, it may be possible to prevent stray light originating from the excitation electromagnetic radiation from efficiently propagating towards the electromagnetic radiation outlet. This may result in a high accuracy of the detected signal so that a sample separation run may be carried out with high precision.

In a flow cell of a fluorescence detector, it may be desired to excite as much fluidic sample flowing through the flow channel as possible with excitation electromagnetic radiation, while ensuring simultaneously that as little excitation electromagnetic radiation as possible will reach the electromagnetic radiation outlet and finally a detecting unit optically coupled therewith. At the same time, as much fluorescence light as possible-created by fluidic sample in response to being excited with the excitation electromagnetic radiation-should reach the electromagnetic radiation outlet and finally the detecting unit. This goal may be challenged by undesired Fresnel reflection and refraction at material interfaces within the flow cell (in particular at boundaries of the flow channel in the cuvette) and between the flow cell and an environment thereof (in particular at exterior or outer boundaries of the cuvette). More specifically, at each glass-air-transition and at each glass-fluidic sample-transition, an abrupt change of the refraction index may occur, resulting in reflection and refraction. Moreover, diffuse scattering may occur at rough surfaces, for instance at fluidic interfaces between the flow channel in the cuvette and fluidically connected inlet and outlet conduits.

Furthermore, black glass or another electromagnetic radiation absorber may be advantageous for absorbing undesired stray light and excitation light, but should be displaced at least partially with regard to a field of view of the electromagnetic radiation outlet and connected detection optics in view of unavoidable fluorescence of such an electromagnetic radiation absorber, and in view of stray light. In an embodiment, the flow cell (in particular the cuvette) is (essentially) free of black (or blackened) glass. This may provide the advantage that undesired fluorescence, which may lead to higher noise in the case of black/blackened glass, can be avoided.

Furthermore, an advantageous design rule of a cuvette according to an exemplary embodiment of the disclosure is to arrange edges and corners at an exterior surface of the cuvette and/or at an exterior (or outer) surface of the flow channel outside of a field of view of the electromagnetic radiation outlet and connected detection optics and thus out of a detection path. This may improve the signal-to-noise ratio in the detection optics and may thereby increase the accuracy of a sample separation run.

Exemplary embodiments of the disclosure are based on the finding that stray light that enters an emission monochromator being optically coupled to the electromagnetic radiation outlet may be a significant source for background signal, limiting the signal-to-noise ratio of the fluorescence detector. More specifically, it has been found that the flow cell plays an important role as stray light source. In particular, inner edges of a flow volume or flow channel and outer edges of the cuvette have been identified to be of particular relevance for an undesired propagation of stray light towards an electromagnetic radiation outlet of the flow cell. In particular, Mie scattering on defects may play a significant role in this context. It has been found that refraction of excitation rays from the flow volume to outer edges may extend an illumination cone. Such edges can be usually directly seen by an emission monochromator arranged optically downstream of an electromagnetic radiation outlet of the flow cell. Furthermore, top- and bottom fluidic connection structures may be a further source of optical detection artifacts (for instance due to direct illumination or after Fresnel reflection). Apart from this, (in particular multiple) total or high angle Fresnel reflection on liquid/glass interfaces and/or glass/air interfaces may occur. Moreover, (in particular multiple) Fresnel reflections from direct excitation light scattered or reflected on cell backside may have to be considered. This may also illuminate an excitation exit slit backside, which may be inside to an acceptance cone angle of the emission monochromator. By appropriately designing a cuvette geometry, flow volume geometry and flow volume position, these sources of artifacts can be efficiency suppressed according to an exemplary embodiment of the disclosure.

In particular, an exemplary embodiment of the disclosure may provide a flow cell with a cuvette for fluorescence measurement comprising a flow channel for conducting a liquid, a light inlet opening through which excitation light can be irradiated for excitation of a fluidic sample located in the flow channel, and comprising a light outlet opening through which fluorescence light emitted by the sample after excitation by the excitation light can propagate out of the flow cell. Advantageously, said fluorescence cuvette may be designed to suppress stray light resulting from the excitation light to propagate towards a light outlet opening.

Advantageously, the described cuvette design may be synergistically combined with an appropriate material selection for the flow cell, in particular by the use of black glass for covering an excitation backside surface of the cuvette for suppressing stray light by absorption while simultaneously keeping undesired but unavoidable fluorescence of the black glass controlled. Thus, an electromagnetic radiation absorber, embodied for instance as black glass, can be used particularly advantageously selectively or only for the opposite side of the cuvette opposite to the excitation path of the cuvette. Thus, such an electromagnetic radiation absorber (e.g., black glass) may be arranged at an exterior (or outer) wall of the cuvette opposing an excitation light inlet.

Yet another advantageous embodiment relates to a manufacturing process ensuring a high surface quality selectively of surfaces of the cuvette at an inlet and an outlet channel being fluidically connected to the flow channel. Advantageously, this may also contribute to the provision of a fluorescence cuvette leading to a strongly reduced signal background (due to phenomena such as scattering and reflection).

Now referring more specifically to advantageous design properties of a flow cuvette according to exemplary embodiment of the disclosure, the cuvette may be shaped, dimensioned and proportioned so that marginal or peripheral light rays of the primary light cone of the excitation electromagnetic radiation beam generated by the excitation light source do not impinge on the outer corners of the cuvette at the excitation backside surface, in particular at least not those that would lead to a direct scattering of the light in the direction of the electromagnetic radiation outlet (in particular emission window).

What concerns a cuvette design according to an exemplary embodiment of the disclosure, it may also be advantageous to ensure that marginal or peripheral light rays of a secondary cone of light, which is caused by refraction of light from the primary cone at inner edges of the flow channel, do not impinge on the outer corners of the flow cell at the excitation backside surface, in particular at least not those that would lead to a direct scattering of the light in the direction of the electromagnetic radiation outlet (in particular emission window).

Furthermore, an advantageous cuvette design may fulfill the additional design rule that, light being (in particular directly) reflected at the wall opposite the light inlet opening (i.e. at the excitation backside surface) of the cuvette of the flow cell, is disabled from impinging on outer corners of the cuvette of the flow cell.

Apart from this, it may be advantageous that direct scattering of light on the wall (i.e. at the excitation backside surface) of the flow cell cuvette opposite to the light inlet in the direction of or towards the electromagnetic radiation outlet (in particular emission window) may be disabled.

By taking one or more of these measures, the extent of Fresnel reflection at the wall opposite the light inlet opening may be reduced, whereby the resulting reflection on the wall opposite to the emission window in the direction of the emission window may be reduced as well.

In embodiments, the geometric design of the flow cell and its cuvette and flow channel may be adapted for suppressing stray light in a detection channel. The width of the cell may be chosen so that the edges of the flow cell are not directly illuminated by the excitation light. The backside should be sufficiently far away from the flow channel so that scattered/reflected light cannot reach the output directly.

Moreover, an exemplary embodiment of the disclosure provides a fluorescence detection flow cell with a cuvette design adjusting a light path so that advantageous properties in terms of stray light and auto-fluorescence may be achieved by covering at least part of an excitation backside surface with an electromagnetic radiation absorber (such as black fused silica). By taking this measure, a flexible planar fluidic interface may be provided which may improve detection accuracy. Advantageously, black fused silica may be used to avoid undesired bright edges in a detector image which may be due to edge defects. Black fused silica may be implemented to efficiently absorb stray radiation.

However, black fused silica shows inherent fluorescence which may cause background noise to rise in fluorescence applications whenever illuminated material is within the field of view of the emission path optics. Moreover, even black fused silica is not a perfect electromagnetic radiation absorber. Diffuse scattering from the surface may cause additional stray light. Moreover, the quality of black fused silica material may be subject to batch-to-batch variations.

In order to at least partially overcome the above-mentioned and/or other shortcomings of electromagnetic radiation absorbers, an electromagnetic radiation absorber may be selectively formed on an excitation backside surface of the cuvette only. According to exemplary embodiments, there may be no noteworthy dependency of black glass quality. Furthermore, no noteworthy auto-fluorescence may occur in an emission path according to an exemplary embodiment of the disclosure. Beyond this, an undesired re-entry of Fresnel radiation and multiple reflections within the cell may be prevented. Apart from this, there is no limit in surface quality and material selection for the fluidic interface due to optical properties.

It has turned out that an electromagnetic radiation absorber selectively on the excitation backside surface of the cuvette may suppress or even eliminate Fresnel reflection of excitation electromagnetic radiation backwards to the electromagnetic radiation outlet. Furthermore, an electromagnetic radiation absorber selectively on the excitation backside surface may be out of the field of view of the emission optics which may prohibit undesired auto-fluorescence from propagating towards the electromagnetic radiation outlet. Furthermore, there may be a full freedom of design concerning material selection of the electromagnetic radiation absorber.

According to yet another exemplary embodiment of the disclosure, a fluorescence detector flow cell may be equipped with wet etched inlet and outlet geometries. Advantageously, this may lead to smooth fluidic surfaces which are not prone to diffuse scattering. Consequently, the signal-to-noise ratio in the detector may be further improved. More specifically, a fluorescence measuring cell with connection blocks having wet etched surfaces may be provided.

In a flow cell, excitation of sample (such as in solution) may be accomplished by excitation electromagnetic radiation (for instance UV light), for instance in an HPLC. For detection purposes, emission electromagnetic radiation resulting from an interaction of the excitation electromagnetic radiation with the fluidic sample may be measured. Advantageously, this may be performed in a 90° arrangement, i.e. with centers of the excitation electromagnetic radiation beam and of the emission electromagnetic radiation beam being perpendicular to each other. For optical reasons, there may be a pronounced change in cross-sectional area from input and output capillary (for example having a diameter of 100 μm) to a measuring chamber (for example having an area of 1×1 $mm^2$). Moreover, the measuring chamber should be transparent and pressure-stable. Inlet and outlet geometry may determine decisively how homogeneously the measuring chamber fills. The measuring chamber may be made of quartz. More specifically, a plurality of blocks made of quartz may be thermally bonded.

However, there is the conventional challenge that the integration of geometry-optimized channel structures in connection blocks may be difficult. This may be due to small dimensions (typically ⅒ mm) and low tolerances (in the order of magnitude of a micrometer) for channel width and/or channel depth. Furthermore, there may be high demands on surface roughness to reduce light scattering. Moreover, a robust and efficient manufacturing process may be needed.

What concerns flow cell design, a flow cell may be composed of a middle part (which may form a measuring chamber) and two connection blocks (in particular an upper and a lower part). The measuring part may be formed of four plates. The measuring chamber may have a rectangular or square shape. Channels may be incorporated into the upper and lower parts. The channel geometry on the top side and on the bottom side may be identical or different. An example of a joining technique is thermal bonding for all plates and/or blocks. Alternatively, a press seal connection may be formed, or a combination of different connection techniques may be utilized. In the case of bonding, joint processing of all outside surfaces may be preferred. Channels may exit at a common outside surface.

Although very thick connection blocks may be used, they may be processed in an unconventional way by wet etching. Thus, they may be formed with an excellent surface quality, small dimensions, low tolerances, a parallel and thus efficient manufacturing process (in particular by wafer processing, i.e. on wafer level), and with all parts equal. Advantageously, wafer manufacturing technology may be implemented as a batch technology for an upper and lower part of the cuvette. The channels may be processed implementing an isotropic etching process. Preferably, the etching rate may be in a range from 0.1 μm/min to 1 μm/min. Advantageously, achievable tolerances may be below 10 μm. Surface quality may be excellent, for instance significantly smaller than 0.1 μm in a ground area, and significantly smaller than 1 μm along line edges. Advantageously, singularization for such a processed wafer may be performed by sawing (in particular with a diamond saw blade), or by a laser scribing and breaking approach. Bonding of the connecting blocks may be accomplished without polishing the front side. The upper and lower parts may be aligned to the middle part before bonding, for instance using mechanical references. The dimensions of the connection blocks may be adjusted with tolerance for joint external processing after bonding.

For example, manufacture of a fluorescence measuring cell may be executed with the following process:
1. Providing a wafer (for instance having a thickness of 7.5 mm)
2. Metallization may be carried out, for example using chromium, wherein optionally an additional protective mask may be formed
3. A channel may be defined by a photolithographic process
4. The metal mask may be opened
5. Remaining photoresist material may be removed
6. Wet etching may be executed
7. The metal mask may be removed
8. Singularization of the wafer into individual bodies may be carried out In particular, the wafer may have a round or square outline. The layout of the upper and the lower part may be defined by a common mask. Step etching may be carried out, for instance when different channel depths are desired. Any channel shapes may be created (for instance meander, distributing structure). Etching adjustment markers may be formed as well.

Referring now in greater detail to the drawings, FIG. 1 depicts a general schematic of a liquid separation system as example for a sample separation apparatus 10 according to an exemplary embodiment of the disclosure. A fluid drive 20 (such as a piston pump) receives a mobile phase from a solvent supply 25 via degassing unit 27, which degases and thus reduces the amount of dissolved gases in the mobile phase. The fluid drive 20 drives the mobile phase through a separation unit 30 (such as a chromatographic column) comprising a stationary phase. A sampler or injector 40, implementing a fluidic valve 95, can be provided between the fluid drive 20 and the separation unit 30 in order to subject or add (often referred to as sample introduction) a sample fluid into the mobile phase so that a fluidic sample and mobile phase may be provided towards a separation path where actual sample separation occurs. The stationary phase of the separation unit 30 is configured for separating compounds of the sample liquid. A detector 50 is provided for detecting separated compounds of the sample fluid. A fractionating unit 60 can be provided for outputting separated compounds of sample fluid in sample containers 102.

While the mobile phase can be comprised of one solvent only, it may also be mixed from plural solvents. Such mixing might be a low pressure mixing and provided upstream of the fluid drive 20, so that the fluid drive 20 already receives and pumps the mixed solvents as the mobile phase. Alternatively, the fluid drive 20 may comprise plural individual pumping units, with the pumping units each receiving and pumping a different solvent or mixture, so that the mixing of the mobile phase (as received by the sample separation unit 30) occurs at high pressure and downstream of the fluid drive 20 (or as part thereof). The composition of the mobile phase may be kept constant over time, the so-called isocratic mode, or varied over time, the so-called gradient mode.

A data processing unit or control unit 70, which can be a PC or workstation, may be coupled (as indicated by the dotted arrows) to one or more of the devices in the sample separation apparatus 10 in order to receive information and/or control operation. For example, the control unit 70 may control operation of the fluid drive 20 (for example setting control parameters) and receive therefrom information regarding the actual working conditions (such as output pressure, etc. at an outlet of the pump). Optionally, the control unit 70 may also control operation of the solvent supply 25 (for example setting the solvent/s or solvent mixture to be supplied) and/or the degassing unit 27 (for example setting control parameters and/or transmitting control commands) and may receive therefrom information regarding the actual working conditions (such as solvent composition supplied over time, vacuum level, etc.). The control unit 70 may further control operation of the sampling unit or injector 40 (for example controlling sample injection or synchronization of sample injection with operating conditions of the fluid drive 20). The separation unit 30 may also be controlled by the control unit 70 (for example selecting a specific flow path or column, setting operation temperature, etc.), and send—in return—information (for example operating conditions) to the control unit 70. Accordingly, the detector 50 may be controlled by the control unit 70 (for example with respect to spectral or wavelength settings, setting time constants, start/stop data acquisition), and send information (for example about the detected sample compounds) to the control unit 70. The control unit 70 may also control operation of the fractionating unit 60 (for example in conjunction with data received from the detector 50) and provides data back.

Now referring in detail to detector 50, an electromagnetic radiation source 190 emits primary electromagnetic radiation, for instance a polychromatic beam with a broad range of wavelengths (for instance from 200 nm to 1100 nm). For example, the electromagnetic radiation source 190 may be a Xenon arc lamp. This broad range of primary electromagnetic radiation wavelengths may allow a user to select a narrow wavelength range from the broad wavelength range in accordance with a desired application. This wavelength selection may be made by an inlet or excitation monochromator 192, such as a Bragg grating. The inlet monochromator 192 may select a narrow bandwidth of for instance 15 nm to 20 nm for use as excitation electromagnetic radiation beam 108 in the shown fluorescence detector 50. This wavelength-selected excitation electromagnetic radiation beam 108 may then propagate through an electromagnetic radiation inlet (see reference sign 106 in FIG. 3) into a cuvette 102 of a flow cell 100. The fluidic sample, which has been separated by the sample separation unit 30, flows through a flow channel 104 extending along the cuvette 102. During flowing through the flow channel 104, the separated fluidic sample interacts with the excitation electromagnetic radiation beam 108, and can thereby be optically excited. For instance, certain amino acids, aromatic molecules, or fluorescence labels of a respective fraction of the separated fluidic sample may be excited by absorption of the excitation electromagnetic radiation. After excitation, the fluidic sample may emit fluorescence radiation, which may propagate as an emission electromagnetic radiation beam 112 to an electromagnetic radiation outlet (see reference sign 110 in FIG. 3). Although not shown in the schematic view of FIG. 1, the flow cell 100 may be configured so that a main propagation direction of the excitation electromagnetic radiation beam 108 is substantially perpendicular to a main propagation direction of the detected emission electromagnetic radiation beam 112. The emission electromagnetic radiation, being characteristic for a corresponding fraction of the fluidic sample, may then propagate to an outlet or emission monochromator 194, such as a Bragg grating. Descriptively speaking, the emission monochromator 194 may select a detection wavelength or a narrower detection wavelength range. Descriptively speaking, emission monochromator 194 may filter out parasitic radiation, such as an optical background radiation or signal as well as parasitic radiation created for instance by Raman and Rayleigh scattering. Emission electromagnetic radiation passing through the emission monochromator 194 may then be detected by a detecting unit 196, such as a photodiode, a linear array of photocells, or a two-dimensional camera (such as a CMOS camera or a CCD camera). The detection data may be transmitted to control unit 70 for further processing.

Figure 2:
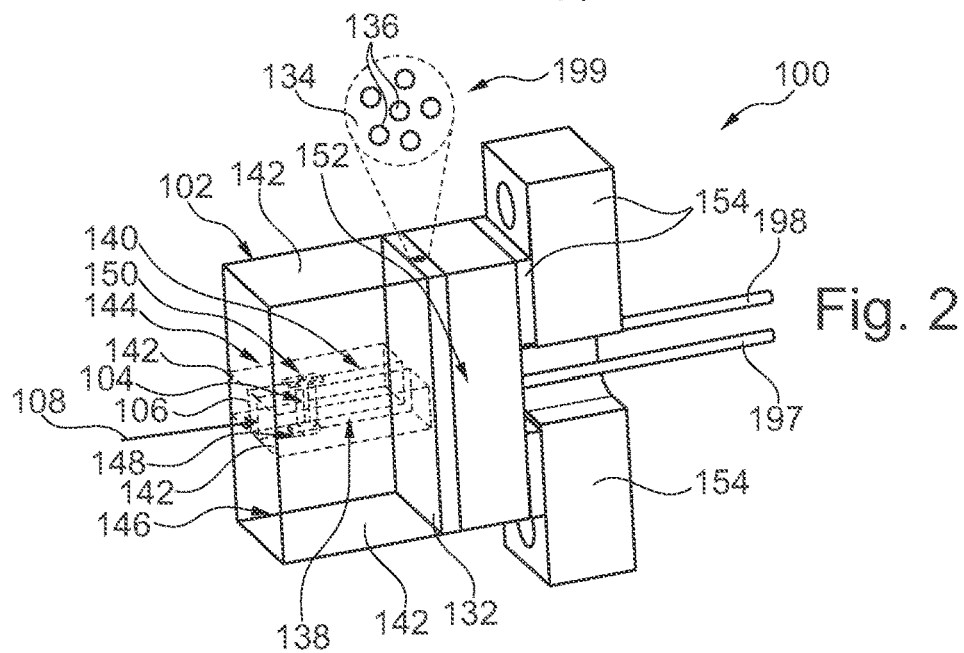
FIG. 2 shows a three-dimensional view of a flow cell according to an exemplary embodiment of the disclosure implementable in the sample separation apparatus of FIG. 1.
Figure 3:
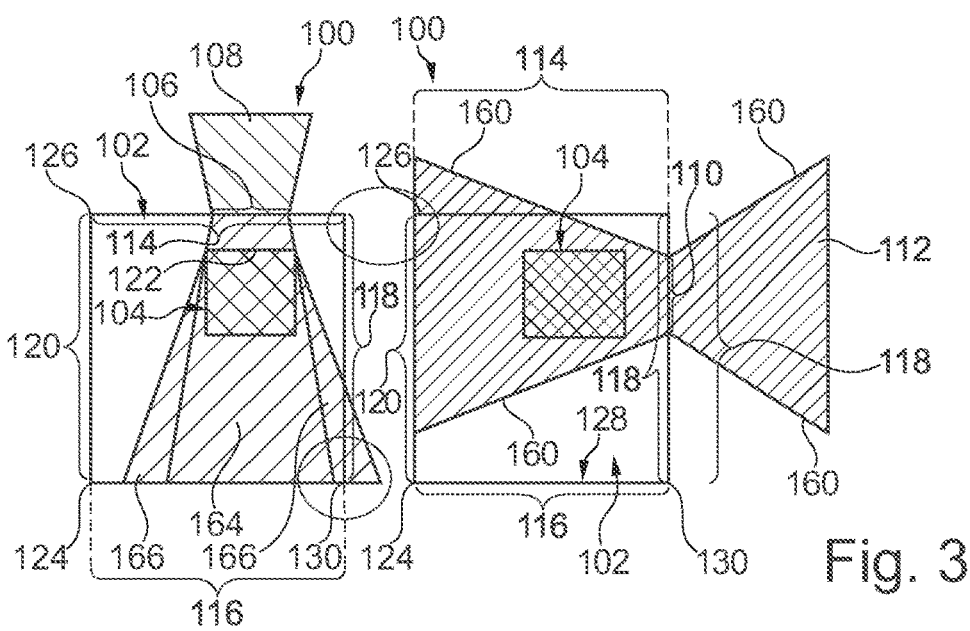
FIG. 3 shows two schematic views of a flow cell according to an exemplary embodiment of the disclosure.

As already mentioned, flow cell 100 may be provided for detecting the fluidic sample separated by the sample separation apparatus 10 and comprises the cuvette 102 (for instance made of silica glass) in which the flow channel 104 is formed as a hollow body through which the separated fluidic sample flows. The excitation electromagnetic radiation beam 108 is coupled into the cuvette 102 at an electromagnetic radiation inlet 106 (FIGS. 2 and 3). Via an electromagnetic radiation outlet 110 (FIG. 3), the emission electromagnetic radiation beam 112—generated by an interaction between the excitation electromagnetic radiation beam 108 and the separated fluidic sample—is coupled out of the cuvette 102. Highly advantageously, the shape and dimension of the cuvette 102 are designed or configured so that electromagnetic radiation is disabled from directly propagating from one, some or all exterior edges of the cuvette 102 (e.g., edges between exterior, or outer, surfaces of the cuvette 102) to the electromagnetic radiation outlet 110. Consequently, the amount of stray light relating to the excitation electromagnetic radiation beam 108 rather than to the emission electromagnetic radiation beam 112 propagating through the electromagnetic radiation outlet 110 may be kept very small. This may lead to a high signal-to-noise ratio of the detected signal, and consequently to a high accuracy of the sample separation result.

Advantageous designs of the flow cell 100 and in particular its cuvette 102 according to exemplary embodiments of the disclosure will be explained in further detail referring to the below figures, in particular referring to FIG. 2, FIG. 3, FIG. 5, FIG. 7, and FIG. 10, as well as FIG. 14 to FIG. 19.

FIG. 2 shows a three-dimensional view of a flow cell 100 according to an exemplary embodiment of the disclosure implementable in the sample separation apparatus 10 of FIG. 1.

The flow cell 100 according to FIG. 2 comprises a substantially cuboid cuvette 102 made of silica glass and having an interior flow channel 104 (also denoted as sample detection volume) to enable a flow of separated fluidic sample through the flow channel 104. As shown, the cuvette 102 is configured as a substantial cuboid body with a substantially cuboid hollow interior volume constituting the flow channel 104. The cuboid cuvette 102 is formed by a plurality of thermally bonded cuboid elements 142. More specifically, cuvette 102 comprises a top plate 144, a bottom plate 146, and side plates. According to FIG. 2, the flow channel 104 is fluidically coupled via a fluidic inlet structure 148 to an inlet channel 138 connected to a first capillary 197 for supplying the separated fluidic sample along a first flow direction (horizontal according to FIG. 2), and via a fluidic outlet structure 150 to an outlet channel 140 fluidically coupled with a second capillary 198 for draining detected separated fluidic sample along a second flow direction (also horizontal according to FIG. 2). While flowing through the flow channel 104, the fluidic sample flows along a third flow direction (oriented vertically according to FIG. 2) perpendicular to the first and second flow directions. Capillaries 197, 198 may extend through electromagnetic radiation absorber 132.

A slit-type electromagnetic radiation inlet 106 of the cuvette 102 is shown in FIG. 3, at which an excitation electromagnetic radiation beam 108 is coupled into the cuvette 102. An electromagnetic radiation outlet (see reference sign 110 in FIG. 3) at which an emission electromagnetic radiation beam 112 (FIG. 3), generated by an interaction between the excitation electromagnetic radiation beam 108 and the separated fluidic sample, is coupled out of the cuvette 102, is not shown in FIG. 2. However, the emission path (relating to reference sign 112) is oriented perpendicular to the excitation path (relating to reference sign 108) according to FIG. 2.

FIG. 2 illustrates that flow cell 100 comprises electromagnetic radiation absorber 132 for absorbing substantially the entire electromagnetic radiation impinging on an excitation backside surface (see reference sign 116 in FIG. 3) of the cuvette 102. Advantageously, the electromagnetic radiation absorber 132 is only provided on the excitation backside surface 116 of the cuvette 102, whereas all other surfaces of the cuvette 102 are free of electromagnetic radiation absorbing material. As shown in a detail 199, the electromagnetic radiation absorber 132 may be made of a matrix material 134 (such as silica glass) with substantially the same refractive index as the cuvette 102 (made of silica glass as well) and additionally comprises electromagnetic radiation absorbing particles 136 embodied as carbon particles. The particles 136 are capable of absorbing electromagnetic radiation (in particular of the excitation electromagnetic radiation beam 108) impinging on the electromagnetic radiation absorber 132. Thus, excitation electromagnetic radiation may be prevented by electromagnetic radiation absorber 132 from being reflected at the excitation backside surface 116 of the cuvette 102 and from parasitically propagating towards the electromagnetic radiation outlet 110 and from there to the detection optics. Thus, background radiation being not specific for the separated fluidic sample may be inhibited from reaching the detecting unit 196 shown in FIG. 1. Consequently, the electromagnetic radiation absorber 132 may contribute to a high signal-to-noise ratio and to an excellent accuracy of the sample separation.

Advantageously, this may be synergistically combined with a shaping, dimensioning and proportioning of the cuvette 102 so that electromagnetic radiation is disabled from directly propagating from at least one or some edges of the cuvette 102 to the electromagnetic radiation outlet 110, as will be explained below in further detail referring to FIG. 3, FIG. 5, and FIG. 7.

FIG. 2 furthermore shows a fluidic connection 152 which may or may not be integrated in the glass parts of the flow cell 100. Beyond this, a mounting structure 154 is shown in FIG. 2.

Figure 4:
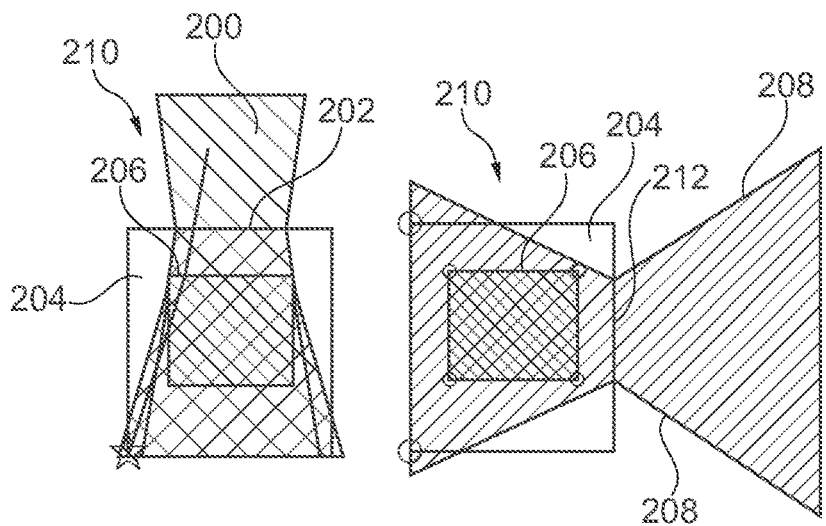
FIG. 4 shows two schematic views of a flow cell for comparison purposes with FIG. 3.

FIG. 3 shows two schematic views of a flow cell 100 according to an exemplary embodiment of the disclosure. FIG. 4 shows two schematic views of a flow cell 210 for comparison purposes with FIG. 3. On the left-hand side of each of FIG. 3 and FIG. 4, the respective flow cell 100, 210 is shown illustrating excitation electromagnetic radiation 108, 200. On the right-hand side of each of FIG. 3 and FIG. 4, the respective flow cell 100, 210 is shown illustrating an emission monochromator field of view 160, 208.

Now referring to flow cell 210 shown in FIG. 4, an excitation electromagnetic radiation beam 200 is coupled through an electromagnetic radiation inlet 202 into a cuvette 204 in which a flow volume 206 is formed. An emission monochromator field-of-view is shown with reference sign 208. Stray light that enters the emission monochromator optically downstream of electromagnetic radiation outlet 212 is a source for background signal, which limits the signal-to-noise ratio of the fluorescence detector. The flow cell 210 plays an important role as a stray light source. Especially stray light generated at edges (see circles and star in FIG. 4) and at defects is important. Thus, a shortcoming of the flow cell 210 shown in FIG. 4 is scattering on inner edges of the flow channel 206 and outer edges of the cuvette 204. Some edges are directly seen by the emission monochromator and reduce the signal-to-noise ratio. Moreover, refraction of excitation rays from the flow volume to outer sides extends an illumination cone to back edges.

These and/or other shortcomings can be overcome by the cuvette design according to FIG. 3 of an exemplary embodiment of the disclosure:

FIG. 3 shows a cross-sectional view of the flow cell 100 for detecting a fluidic sample separated by a sample separation apparatus 10. The separated fluidic sample to be detected using the flow cell 100 flows perpendicular to the paper plane of FIG. 3 along the flow channel 104 with rectangular cross-section formed in a cuvette 102 with rectangular cross-section.

At an electromagnetic radiation inlet 106 formed for instance as a slit in an excitation frontside surface 114 of the cuvette 102, an excitation electromagnetic radiation beam 108 is optically coupled into the cuvette 102 and propagates towards an excitation backside surface 116 of the cuvette 102 opposing the excitation frontside surface 114. Thus, the electromagnetic radiation inlet 106 may be defined by an inlet slit at excitation frontside surface 114 of the cuvette 102. It is also possible that the electromagnetic radiation inlet 106 is defined by an excitation monochromator (see reference sign 192 in FIG. 1) optically coupled to the excitation frontside surface 114 of the cuvette 102. The excitation frontside surface 114 and the excitation backside surface 116 are arranged parallel to each other. When the excitation electromagnetic radiation beam 108 interacts with separated fluidic sample flowing through the flow channel 104, part of the excitation electromagnetic radiation beam 108 may be absorbed by the fluidic sample and thereby excites the latter. The excited fluidic sample may then re-emit fluorescence radiation as an emission electromagnetic radiation beam 112. The fluorescence radiation emitted by the fluidic sample may propagate in all spatial directions in accordance with a spherical characteristic.

Furthermore, an electromagnetic radiation outlet 110 is defined as an aperture in an emission frontside surface 118 of the cuvette 102. It is possible that the electromagnetic radiation outlet 110 is defined by an emission monochromator (see reference sign 194 in FIG. 1) optically coupled to the emission frontside surface 118 of the cuvette 102. The emission frontside surface 118 and an emission backside surface 120 are arranged parallel to each other, and both may be oriented perpendicular to the excitation frontside surface 114 and the excitation backside surface 116. Thus, an emission electromagnetic radiation beam 112, generated by an interaction between the excitation electromagnetic radiation beam 108 and the separated fluidic sample in the flow channel 104, can be coupled out of the cuvette 102 through the electromagnetic radiation outlet 110.

Again referring to the image on the left-hand side of FIG. 3, the excitation electromagnetic radiation beam 108 impinging on the flow channel 104 may partially be absorbed by fluidic sample in the flow channel 104, may partially pass the flow channel 104 without being absorbed (see reference sign 164), and may partially be refracted (see reference sign 166) at a material interface 122 between the cuvette 102 and the flow channel 104 having different refraction index values.

In the following, the design of the cuvette 104 according to FIG. 3 for increasing the signal-to-noise ratio and thereby improving the detection accuracy as compared to the embodiment of FIG. 4 will be described in further detail:

Advantageously and as shown on the right-hand side of FIG. 3, the cuvette 102 is shaped so that the entire excitation backside surface 116 of the cuvette 102 is outside of the direct field of view 160 of the electromagnetic radiation outlet 110. Hence, the cuvette 102 is shaped so that an entire area 128 of the excitation backside surface 116 of the cuvette 102 is outside of the direct field of view 160 of the electromagnetic radiation outlet 110. Further advantageously, the cuvette 102 is shaped so that an edge 124 at an interface between the emission backside surface 120 and the excitation backside surface 116 of the cuvette 102 is outside of the direct field of view 160 of the electromagnetic radiation outlet 110. Consequently, stray light originating from the excitation electromagnetic radiation beam 108 is strongly inhibited from directly entering the electromagnetic radiation outlet 110 from edge 124 and a connected surface area of the excitation backside surface 116.

Although not shown, the cuvette 102 may also be shaped so that an edge 126 between the excitation frontside surface 114 and the emission backside surface 120 of the cuvette 102 is outside of the direct field of view 160 of the electromagnetic radiation outlet 110. This may further decrease stray radiation reaching the detector optics downstream of the electromagnetic radiation outlet 110. For instance, this may be achieved by extending a length L (see FIG. 5) of the cuvette 102 in the vertical direction according to the right-hand side of FIG. 3 and by locating the electromagnetic radiation outlet 110 further downwardly until the upper end of the field of view 160 starts below the edge 126.

Now referring to the left-hand side of FIG. 3, the cuvette 102 is shaped so that the part of the excitation electromagnetic radiation beam 108 according to reference sign 164 which is not refracted at interface 122 between the cuvette 102 and the flow channel 104 but propagates through the flow channel 104 and further to the excitation backside surface 116 does not impinge on an edge 130 between the excitation backside surface 116 and the emission frontside surface 118. As a result, only the refracted part of the excitation electromagnetic radiation beam 108 according to reference sign 166 may reach the edge 130. However, the refraction has already reduced the intensity of the part 166 significantly, so that the impact of this part 166 on the detected accuracy is very small.

Highly advantageously, both edges 124 and 130 are therefore outside of the field of view 160 of the electromagnetic radiation outlet 110 and/or of the emission monochromator (see reference sign 194 in FIG. 1). Moreover, the behavior of the edge 124 is also improved what concerns its relation to the excitation electromagnetic radiation beam 108 (see left-hand side of FIG. 3).

An advantageous design rule for efficiently suppressing stray radiation in the direct field of view 160 of the electromagnetic radiation outlet 110 is that the flow channel 104 is arranged in the cuvette 102 closer to the excitation frontside surface 114 than to the excitation backside surface 116 and/or closer to the emission frontside surface 118 than to the emission backside surface 120. Thus, an asymmetric arrangement of the flow channel 104 in the cuvette 102 in a horizontal direction and/or in a vertical direction according to FIG. 3 may promote this advantageous effect. For instance, a center of gravity of the flow channel 104 in the cross-sectional view of FIG. 3 may be displaced with respect to a center of gravity of the cuvette 102 one or both the horizontal and vertical directions.

According to the embodiment of FIG. 3, in particular the optical behavior of outer edges of the flow cuvette 102 are significantly improved compared to the approach of FIG. 4. In particular, the design of FIG. 3 may prevent cuvette edges from being hit by excitation light (either directly or by refracted light from the flow volume). What concerns the right flow cell edges, there is advantageously no direct path into emission.

Although not shown in FIG. 3, the behavior on the excitation backside surface 116 may be further improved by covering the latter with an electromagnetic radiation absorber 132 (see FIG. 2). Altogether, the design configurations according to FIG. 3 may result in a high signal-to-noise ratio and may reliably prevent excessively glowing edges in a detector image. Descriptively speaking, one or more edges of the cuvette 102 may be spatially shifted outwardly until they are no longer illuminated directly.

Figure 5:
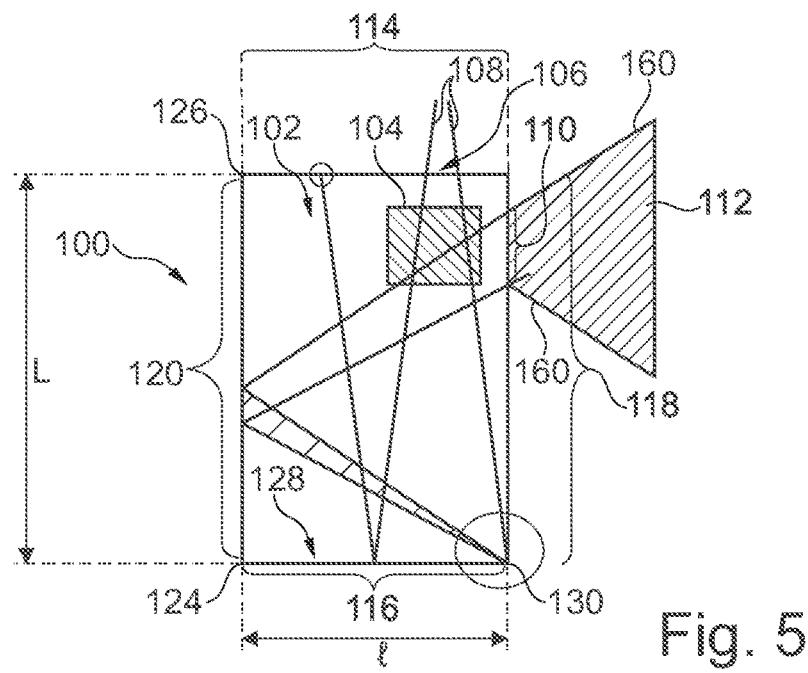
FIG. 5 shows a schematic view of a flow cell according to an exemplary embodiment of the disclosure.
Figure 6:
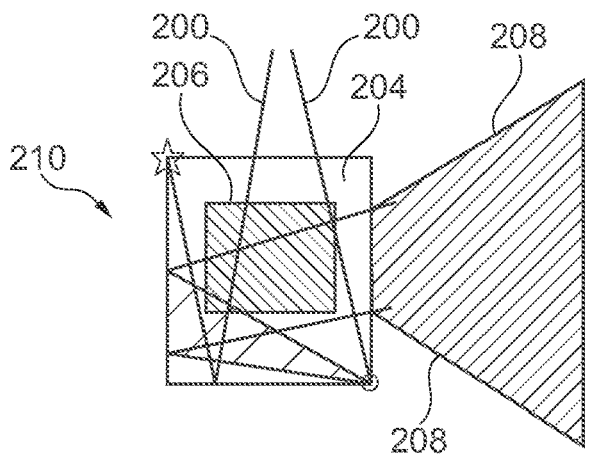
FIG. 6 shows a schematic view of a flow cell for comparison purposes with FIG. 5.

FIG. 5 shows a schematic view of a flow cell 100 according to an exemplary embodiment of the disclosure. FIG. 6 shows a schematic view of a flow cell 210 for comparison purposes with FIG. 5.

As shown in FIG. 6, Fresnel reflections on the backside of the flow cuvette 204 may direct stray light to front edges in an undesired way. Furthermore, it may be problematic that Fresnel reflections from stray light generated by back edges are inside the emission field of view 208. In particular, the region indicated with a star in FIG. 6 may be highly problematic. Hence, FIG. 6 shows that Fresnel reflections can create optical paths for stray light reaching the emission field of view.

These shortcomings may be overcome at least partially with the design according to FIG. 5: As shown, excitation electromagnetic radiation beam 108 propagating from the electromagnetic radiation inlet 106 to the excitation backside surface 116 and being reflected from the excitation backside surface 116 backwards is disabled from reaching an edge 126 between the excitation frontside surface 114 and the emission backside surface 120.

Furthermore, the cuvette 102 of FIG. 5 is shaped so that excitation electromagnetic radiation beam 108 reflected at a large partial area 128 of the excitation backside surface 116 of the cuvette 102 is outside of the direct field of view 160 of the electromagnetic radiation outlet 110.

FIG. 5 also shows a side length L of the cuvette 102 along the emission frontside surface 118 and the emission backside surface 120 as compared to a side length l along the excitation frontside surface 114 and the excitation backside surface 116.

Descriptively speaking, an aspect of the solution according to FIG. 5 is to increase the flow cuvette width (i.e. dimension l) to prevent Fresnel reflections from reaching the edge 126. Furthermore, it may be advantageous to increase also the flow cuvette height (i.e. dimension L) to decrease a solid angle of Fresnel reflected light reaching emission. Advantageously, the volume of the cuvette 102 compared to the volume of the flow channel 104 may be increased, the length-to-width ratio may be increased, and the flow channel 104 may be arranged asymmetrically in the cuvette 102 for achieving advantageous effects in terms of stray light suppression.

Figure 7:
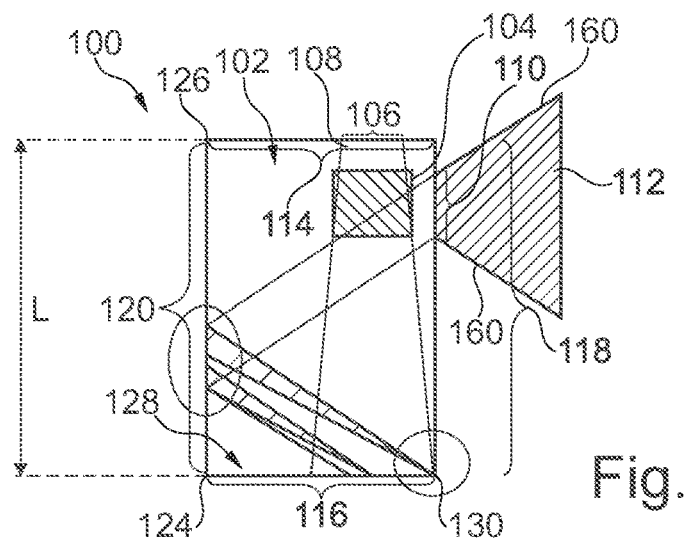
FIG. 7 shows a schematic view of a flow cell according to an exemplary embodiment of the disclosure.

FIG. 7 shows a schematic view of a flow cell 100 according to an exemplary embodiment of the disclosure.

Figure 8:
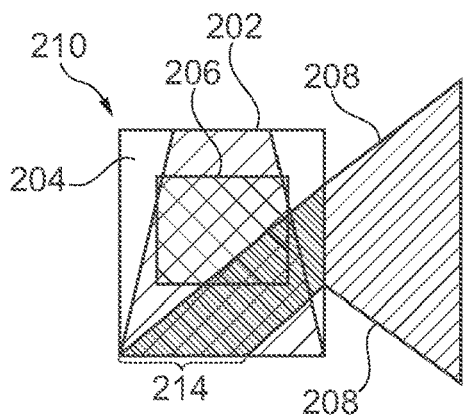
FIG. 8 shows a schematic view of a flow cell for comparison purposes with FIG. 7.
Figure 9:
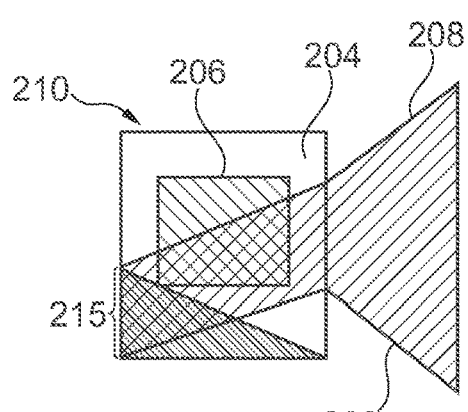
FIG. 9 shows another schematic view of a flow cell for comparison purposes with FIG. 7.

FIG. 8 and FIG. 9 show two schematic views of a flow cell 210 for comparison purposes with FIG. 7.

As illustrated in FIG. 8 and FIG. 9, Fresnel reflections can create optical paths for stray light reaching the emission field of view 208.

Corresponding shortcomings of the flow cells 210 according to FIG. 8 and FIG. 9 are that scattered light (going in random directions) from the back side of the respective flow cuvette 204 reaches the emission field of view 208 directly (see FIG. 8) or by a single Fresnel reflection (see FIG. 9). The origin of parasitic stray rays are indicated with reference sign 214 in FIG. 8 and with reference sign 215 in FIG. 9.

In the embodiment of FIG. 7, the shortcoming of FIG. 8 may be prevented entirely and the shortcoming according to FIG. 9 may be reduced. Descriptively speaking, this may be achieved by an increase of the flow cuvette height (i.e. to increase dimension L) to eliminate direct scattering into emission field of view 160. Furthermore, it may be advantageous to increase the flow cuvette height (i.e. to increase dimension L) to decrease an acceptance angle for Fresnel reflections after scattering.

Furthermore, also in the embodiment of FIG. 7, it may be advantageous to provide an electromagnetic radiation absorber 132 (FIG. 2) on the excitation backside surface 116. In an embodiment, it may be preferred that the electromagnetic radiation absorber 132 be provided with the same value of the refractive index as the material for cuvette 102. Thereby, reflections at an interface between cuvette 102 and electromagnetic radiation absorber 132 may be disabled. By arranging the electromagnetic radiation absorber 132 highly remotely from the electromagnetic radiation outlet 110 (which can be achieved by the asymmetric arrangement of the flow channel 104 with respect to the cuvette 102 shown in FIG. 7), the impact of parasitic fluorescence of the electromagnetic radiation absorber 132 may be strongly suppressed.

Figure 10:
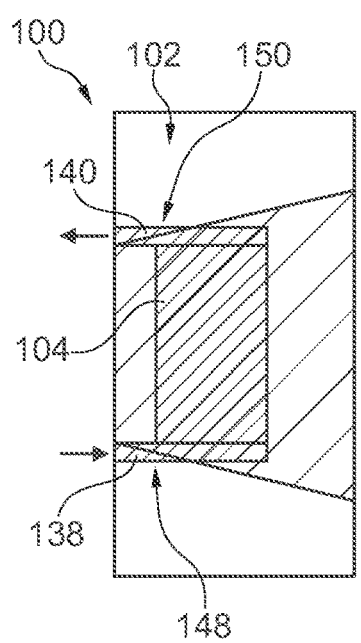
FIG. 10 shows a schematic view of a flow cell according to an exemplary embodiment of the disclosure.
Figure 11:
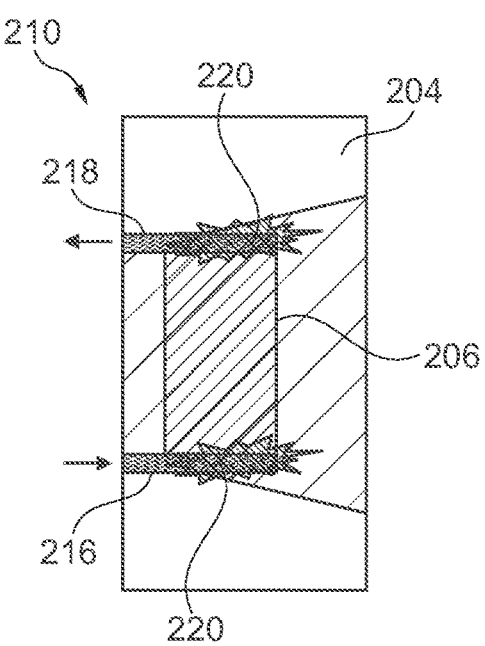
FIG. 11 shows a schematic view of a flow cell for comparison purposes with FIG. 10.

FIG. 10 shows a schematic view of a flow cell 100 according to an exemplary embodiment of the disclosure. FIG. 11 shows a schematic view of a flow cell 210 for comparison purposes with FIG. 10.

According to a FIG. 11, there may be the issue that fluid inlet channel 216 and fluid outlet channel 218 are inside an angular range of excitation and emission light. Consequently, scattering 220 from interfaces of inlet channel 216 and/or outlet channel 218 may contribute to stray light. Hence, scattered light going in random directions from inlet channel 216 and outlet channel 218 connected to the flow channel 206 may contribute to stray light dependent on their surface roughness.

According to the embodiment of FIG. 10, such shortcomings may be at least partially overcome by locally smoothing at least part of a surface of the inlet channel 138 and/or the outlet channel 140. For instance, this may be achieved by laser polishing and/or wet etching surfaces of the inlet channel 138 and the outlet channel 140 during manufacture. As a result, the optical surface quality of channels 138, 140 may be significantly improved. Wet etching of channels may provide the best surface quality. Laser ablation with laser polishing also provides a significantly improved optical surface quality.

Figure 12:
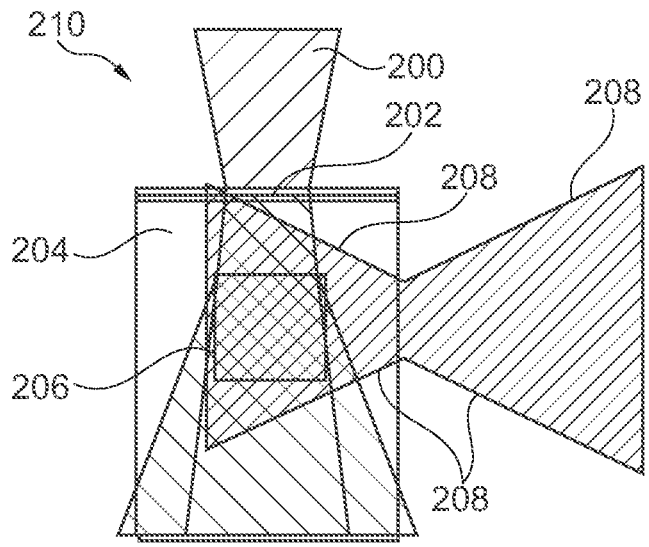
FIG. 12 shows a schematic view of electromagnetic beams in a flow cell.
Figure 13:
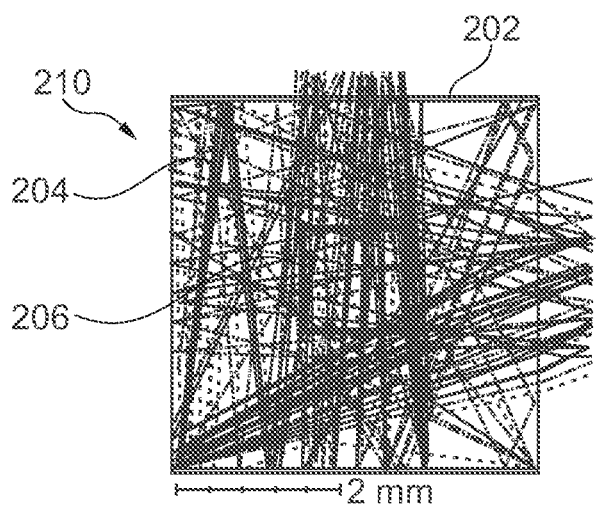
FIG. 13 shows another schematic view of electromagnetic beams in a flow cell.

FIG. 12 and FIG. 13 show different electromagnetic beams in a flow cell 210.

Referring to FIG. 12, excitation light 200 is coupled through electromagnetic radiation inlet 202 into cuvette 204 in which flow volume 206 is formed. An emission monochromator field-of-view is shown with reference sign 208. As shown in FIG. 13, an unwanted design of cuvette 204 may lead to many stray light paths, and thus a lower signal-to-noise ratio of the detector signal.

Figure 14:
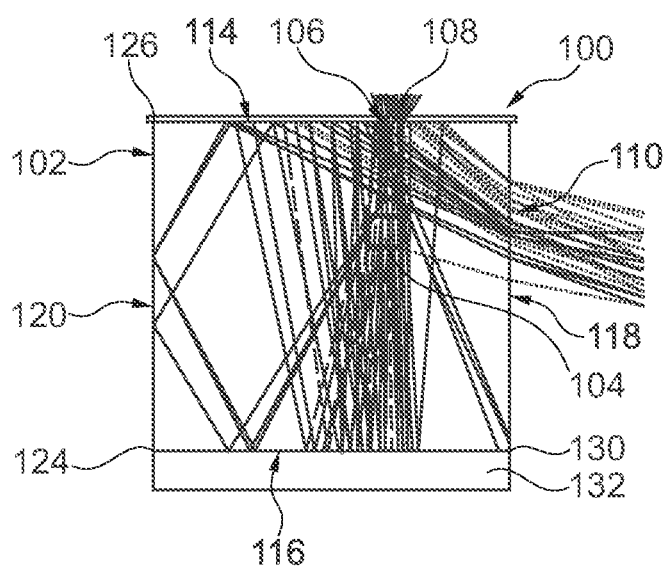
FIG. 14 shows a schematic view of a flow cell according to an exemplary embodiment of the disclosure.

FIG. 14 shows a schematic view of a flow cell 100 according to an exemplary embodiment of the disclosure.

Contrary to FIG. 12 and FIG. 13, in the cuvette design of FIG. 14 according to an exemplary embodiment of the disclosure, no or only very minor light paths exist that may lead to illuminated cuvette edges by excitation light (either directly or by refracted light). Advantageously, no direct collection of scattered and/or reflected light from the cuvette backside occurs according to FIG. 14. In contrast to this, one or more reflection or scattering events are required to create parasitic stray light in the detection path due to the cuvette design. Since the intensity of parasitic light is significantly reduced with each reflection or scattering event, indirect stray light provides only a very minor contribution to a background signal in the detector 50 (FIG. 1). Furthermore, no high efficiency (i.e. large angle) Fresnel reflections occur according to the embodiment of FIG. 14 thanks to the illustrated cuvette design. This includes a geometrically asymmetric coupling of an excitation electromagnetic radiation beam 108 into the cuvette 102, a horizontally and vertically asymmetric location of the flow channel 104 in the cuvette 102, and the provision of an electromagnetic radiation absorber 132 selectively only on the excitation backside surface 116 of the cuvette 102.

The cuvette design according to FIG. 14 may be applied to different flow volumes (for instance for a flow volume of 2 µl and for a flow volume of 13 µl). In order to avoid additional stray light which may be generated by the inflow/outflow channels for the fluidic connection of the flow volume, it may be advantageous to adjust the roughness of the inflow/outflow channels to be sufficiently small by controlling the roughness of the channel surfaces.

Figure 15:
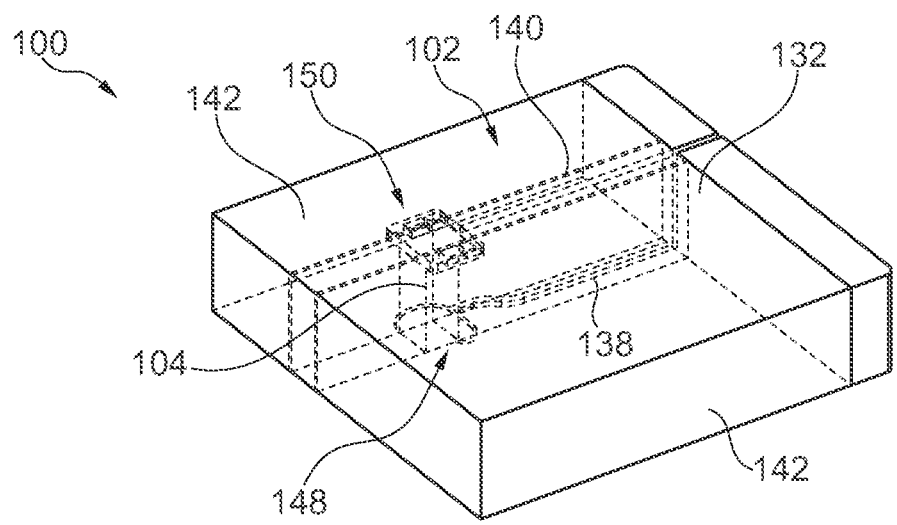
FIG. 15 shows a three-dimensional view of a flow cell according to an exemplary embodiment of the disclosure.
Figure 16:
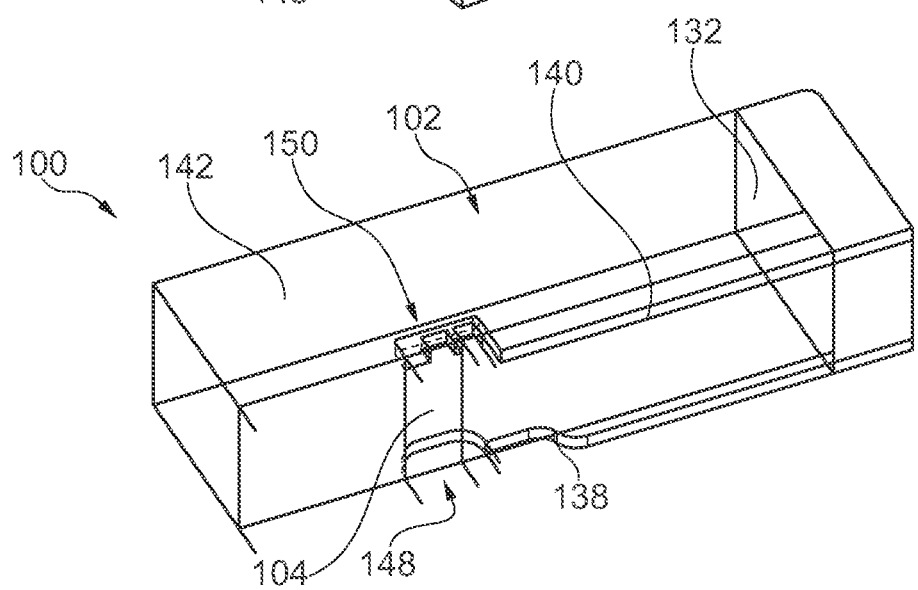
FIG. 16 shows a three-dimensional cross-sectional view of part of the flow cell according to FIG. 15.
Figure 17:
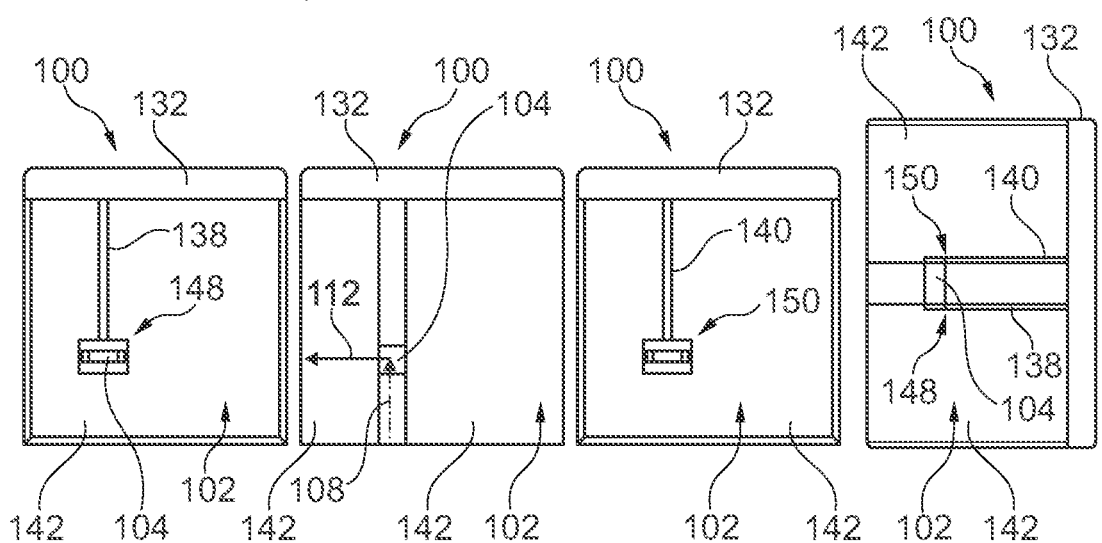
FIG. 17 shows different two-dimensional views of the flow cell according to FIG. 15 and FIG. 16.

FIG. 15 shows a three-dimensional view of a flow cell 100 according to an exemplary embodiment of the disclosure. FIG. 16 shows a three-dimensional cross-sectional view of part of the flow cell 100 according to FIG. 15. FIG. 17 shows different two-dimensional views of the flow cell 100 according to FIG. 15 and FIG. 16. The embodiment of FIG. 15 to FIG. 17 corresponds to a flow cell design according to FIG. 2.

FIG. 15 to FIG. 17 indicate an embodiment in which the cuvette 102 is constructed by connecting a plurality of silica glass blocks embodied as cuboid elements 142. Channels 138, 140 may be formed by laser ablation, and may then be circumferentially closed by connecting cuboid elements 142 by thermal bonding. From left to right, FIG. 17 shows the flow cell 100 in a bottom view, in a cross-sectional view, in a top view, and in a side view.

Advantageously, the black rear side formed by electromagnetic absorber (or black absorber plate) 132 significantly reduces or even eliminates Fresnel reflection of rays of the excitation electromagnetic radiation beam 108 back towards the detection volume or flow channel 104 and any structures that could guide light into the emission path. The position of the black absorber plate 132 outside the field-of-view of the emission optics prohibits auto-fluorescence to from coupling into the emission path. The black absorber plate 132 shields the fluidic connection interface and thus provides a high degree of freedom for selection of materials and geometries such as fluorescing materials, high-reflectivity materials and shiny surfaces (which may be associated with a flat seal). This flexibility allows for different connection technologies, such as planar structures and classic tubing.

Figure 18:
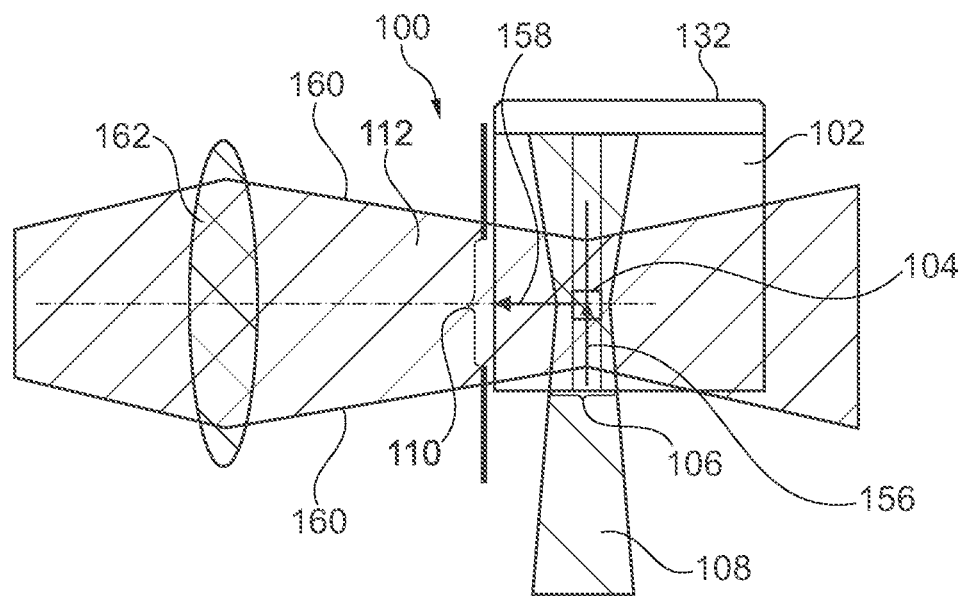
FIG. 18 shows a beam path in a flow cell according to an exemplary embodiment of the disclosure.

FIG. 18 shows a beam path in a flow cell 100 according to an exemplary embodiment of the disclosure. Reference sign 156 indicates a central axis of excitation electromagnetic radiation beam 108, whereas reference sign 158 indicates a central axis of emission electromagnetic radiation beam 112. The field of view 160 of the electromagnetic radiation outlet 110, which may also be denoted as emission field-of-view, is shown with reference sign 160. Furthermore, FIG. 18 shows an emission optics 162 in a schematic illustration. For instance, emission optics 162 may comprise one or more of an ellipsoidal mirror, a lens or lens system, a grating and/or any other of the element(s) defining an aperture at the detection side. In other words, the electromagnetic radiation outlet 110 may be defined by a numerical aperture of the emission path. The emission optics 162 (in particular an ellipsoidal mirror thereof) may collect light propagating through the electromagnetic radiation outlet 110 and may define an angular range of detected light. This angular range may be selected for capturing as much emission electromagnetic radiation as possible and as little excitation electromagnetic radiation as possible. Rather than embodying the electromagnetic radiation outlet 110 as slit (which may be a preferred embodiment of electromagnetic radiation inlet 106), FIG. 18 may defines the outcoupled light portion by a numerical aperture of the detection optics.

Advantageously, the black rear side formed by the electromagnetic radiation absorber 132 on the excitation backside surface eliminates Fresnel reflection of excitation radiation back towards the detection volume and any structures that can guide light into the emission path. The position of the black absorber plate 132 outside the field-of-view 160 of the emission optics prohibits auto-fluorescence from coupling into the emission path. The black absorber plate 132 shields the fluidic connection interface and thus provides freedom for selection of materials and geometries such as fluorescing materials, high-reflectivity materials and shiny surfaces.

Figure 19:
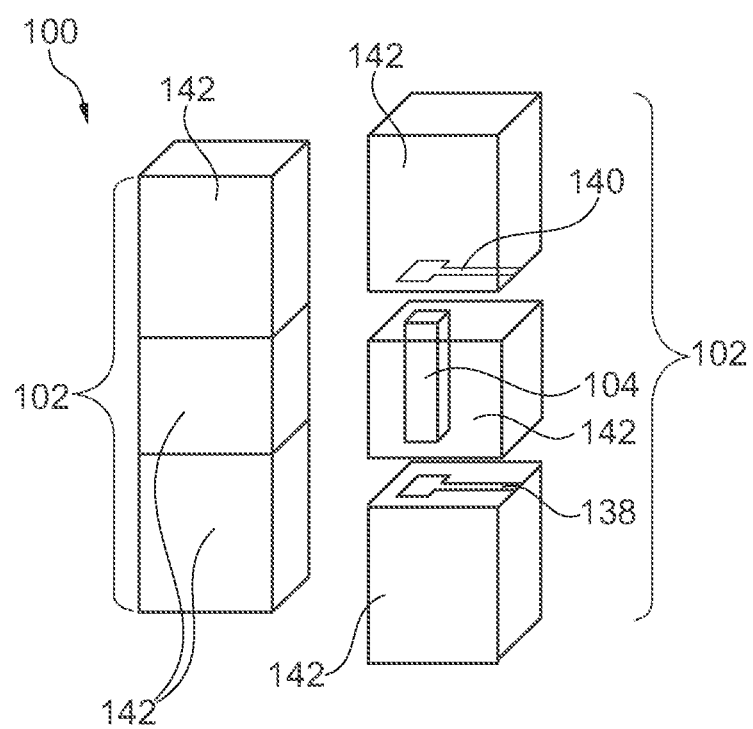
FIG. 19 shows construction of a cuvette of a flow cell according to an exemplary embodiment of the disclosure.

FIG. 19 shows construction of a cuvette 102 of a flow cell 100 according to an exemplary embodiment of the disclosure. The cuvette 102 according to FIG. 19 may be in particular of the type corresponding to the embodiments of FIG. 2, and FIG. 15 to FIG. 17. As shown, the cuvette 102 is formed by a plurality of thermally bonded cuboid elements 142. Before thermal bonding, fluidic structures may be formed in the individual cuboid elements 142. In particular, a through hole may be formed in the central cuboid element 142 to constitute the flow channel 104. In the peripheral cuboid elements 142, grooves may be formed and shaped so as to create inlet channel 138 and outlet channel 140, respectively.

In an embodiment, formation of the fluidic structures, in particular of channels 138, 140, may be carried out by wet etching for obtaining a high smoothness, for instance a smoothness in accordance with surface structures having dimensions of not more than 10 nm to 20 nm. Highly advantageously, such a locally higher smoothness may reduce undesired diffuse scattering of electromagnetic radiation at channels 138, 140, which may reduce stray light in the detector optics. Advantageously, wet etched channels 138, 140 may be created by a wafer level process and therefore in a highly efficient way executable on an industrial scale.

A similar result, as obtainable by wet etching, may be achieved by laser polishing channels 138, 140 after their formation. For instance, the channels 138, 140 may be formed by an ablation process, which may create rough structures. By laser polishing such structures, very smooth channels 138, 140 may be obtained. Diffuse scattering may thus be efficiently suppressed.

It should be noted that the term "comprising" does not exclude other elements or features and the term "a" or "an" does not exclude a plurality. Also elements described in association with different embodiments may be combined. It should also be noted that reference signs in the claims shall not be construed as limiting the scope of the claims.

LIST OF REFERENCE SIGNS

10 sample separation apparatus
20 fluid drive
25 solvent supply
27 degassing unit
30 separation unit
40 injector
50 detector
60 fractionating unit
70 control unit
95 fluidic valve
100 flow cell
102 cuvette
104 flow channel
106 electromagnetic radiation inlet
108 excitation electromagnetic radiation beam
110 electromagnetic radiation outlet
112 emission electromagnetic radiation beam
114 excitation frontside surface
116 excitation backside surface
118 emission frontside surface
120 emission backside surface
122 interface
124 edge
126 edge
128 area
130 edge
132 electromagnetic radiation absorber
134 matrix material
136 electromagnetic radiation absorbing particles
138 inlet channel
140 outlet channel
142 cuboid element
144 top plate
146 bottom plate
148 fluidic inlet structure
150 fluidic outlet structure
152 fluidic connection
154 mounting structure
156 central axis
158 central axis
160 direct field of view
162 emission optics
164 part not being refracted
166 part being refracted
190 electromagnetic radiation source
192 excitation monochromator
194 emission monochromator
196 detecting unit
197 first capillary
198 second capillary
199 detail
200 excitation electromagnetic radiation beam
202 electromagnetic radiation inlet
204 cuvette
206 flow volume
208 emission monochromator field-of-view
210 flow cell
212 electromagnetic radiation outlet 214 origin of parasitic stray rays
215 origin of parasitic stray rays
216 inlet channel
218 outlet channel
220 scattering

The invention claimed is:

1. A flow cell for detecting a fluidic sample separated by a sample separation apparatus, the flow cell comprising:
   a cuvette;
   a flow channel formed at least partially in the cuvette and configured to enable a flow of the separated fluidic sample through the flow channel;
   an electromagnetic radiation inlet at which an excitation electromagnetic radiation beam is couplable into the cuvette; and
   an electromagnetic radiation outlet at which an emission electromagnetic radiation beam, generated by an interaction between the excitation electromagnetic radiation beam and the separated fluidic sample, is couplable out of the cuvette,
   wherein the cuvette has a configuration according to at least one of the following:
      the cuvette comprises a straight-sided excitation backside surface opposing the electromagnetic radiation inlet, and a geometry of the cuvette is configured so that at least one point at the excitation backside surface is outside of a direct field of view of the electromagnetic radiation outlet;
      the cuvette comprises a straight-sided emission backside surface opposing the electromagnetic radiation outlet, and a geometry of the cuvette is configured so that at least one edge at the emission backside surface is outside of the direct field of view of the electromagnetic radiation outlet.

2. The flow cell according to claim 1, wherein the configuration of the cuvette comprises both of the following:
   the cuvette comprises the excitation backside surface, and the geometry of the cuvette is configured so that the at least one point at the excitation backside surface is outside of the direct field of view of the electromagnetic radiation outlet; and
   the cuvette comprises the emission backside surface, and the geometry of the cuvette is configured so that the at least one edge at the emission backside surface is outside of the direct field of view of the electromagnetic radiation outlet.

3. The flow cell according to claim 1, wherein the geometry of the cuvette is defined by at least one of the following:
   a length in the direction of the excitation electromagnetic radiation beam;
   a width perpendicular to the direction of the excitation electromagnetic radiation beam;
   a position of the electromagnetic radiation outlet relative to a position of the electromagnetic radiation inlet and/or a position of the flow channel.

4. The flow cell according to claim 1, wherein the cuvette comprises the excitation backside surface, and the geometry of the cuvette is shaped so that at least one edge at the excitation backside surface is outside of the direct field of view of the electromagnetic radiation outlet.

5. The flow cell according to claim 1, wherein the cuvette comprises the excitation backside surface and the emission backside surface, and the geometry of the cuvette is shaped so that an edge between the excitation backside surface and the emission backside surface is outside of the direct field of view of the electromagnetic radiation outlet.

6. The flow cell according to claim 1, wherein the cuvette comprises the excitation backside surface, and further comprises one of the following features:
   wherein the geometry of the cuvette is shaped so that at least part of an area of the excitation backside surface is outside of the direct field of view of the electromagnetic radiation outlet;
   wherein the geometry of the cuvette is shaped so that an entire area of the excitation backside surface is outside of the direct field of view of the electromagnetic radiation outlet.

7. The flow cell according to claim 1, wherein the cuvette comprises the emission backside surface and an excitation frontside surface, and geometry of the cuvette is shaped so that an edge between the excitation frontside surface and the emission backside surface is outside of the direct field of view of the electromagnetic radiation outlet.

8. The flow cell according to claim 1, comprising at least one of the following features:
   wherein the cuvette comprises the excitation backside surface and an emission frontside surface, and the geometry of the cuvette is shaped so that at least a part of the excitation electromagnetic radiation beam, which is not refracted at an interface between the cuvette and the flow channel but propagates through the flow channel and further to the excitation backside surface, does not impinge on an edge between the excitation backside surface and the emission frontside surface;
   wherein the cuvette comprises the excitation backside surface and the emission backside surface, and the geometry of the cuvette is shaped so that at least a part of the excitation electromagnetic radiation beam, which is not refracted at an interface between the cuvette and the flow channel but propagates through the flow channel and further to the excitation backside surface, does not impinge on an edge between the excitation backside surface and the emission backside surface.

9. The flow cell according to claim 1, wherein:
   the cuvette comprises the excitation backside surface, the emission backside surface, and an excitation frontside surface; and
   the geometry of the cuvette is shaped so that at least a part of the excitation electromagnetic radiation beam, which propagates from the electromagnetic radiation inlet to the excitation backside surface and is reflected from the excitation backside surface backwards, is disabled from reaching an edge between the excitation frontside surface and the emission backside surface.

10. The flow cell according to claim 1, wherein the cuvette comprises the excitation backside surface, and the geometry of the cuvette is shaped so that at least a part of the excitation electromagnetic radiation beam, which is reflected at at least one point at the excitation backside surface, is outside of a direct field of view of the electromagnetic radiation outlet.

11. The flow cell according to claim 1, wherein the cuvette comprises the excitation backside surface, and further comprising one of the following features:
   an electromagnetic radiation absorber configured to absorb electromagnetic radiation and arranged on the excitation backside surface;
   an electromagnetic radiation absorber configured to absorb electromagnetic radiation and arranged only on the excitation backside surface.

12. The flow cell according to claim 11, comprising one of the following features:

wherein the electromagnetic radiation absorber comprises a matrix material with the same refractive index as the cuvette and electromagnetic radiation-absorbing particles;

wherein the electromagnetic radiation absorber comprises a matrix material with the same refractive index as the cuvette and electromagnetic radiation-absorbing particles, and wherein the radiation-absorbing particles comprise carbon particles.

13. The flow cell according to claim 1, wherein a shape and a dimension of the cuvette are configured so that electromagnetic radiation is disabled from directly propagating from at least one edge of the cuvette to the electromagnetic radiation outlet.

14. The flow cell according to claim 1, comprising at least one of the following features:

wherein the flow channel is fluidically coupled to an inlet channel for supplying separated fluidic sample to be detected and to an outlet channel for draining detected separated fluidic sample;

wherein the flow channel is fluidically coupled to an inlet channel for supplying separated fluidic sample to be detected and to an outlet channel for draining detected separated fluidic sample, and at least part of a surface of the inlet channel and/or the outlet channel is a locally smoothed surface;

wherein the flow channel is fluidically coupled to an inlet channel for supplying separated fluidic sample to be detected and to an outlet channel for draining detected separated fluidic sample, and at least part of a surface of the inlet channel and/or the outlet channel is a laser-polished surface and/or a wet-etched surface;

wherein the cuvette comprises the excitation backside surface and an excitation frontside surface, and the flow channel is arranged in the cuvette closer to the excitation frontside surface than to the excitation backside surface;

wherein the cuvette comprises the emission backside surface and an emission frontside surface, and the flow channel is arranged in the cuvette closer to the emission frontside surface than to the emission backside surface;

wherein the cuvette comprises an excitation frontside surface, and the electromagnetic radiation inlet is defined by an inlet slit at the excitation frontside surface and/or by an excitation monochromator optically coupled to the excitation frontside surface;

wherein the cuvette comprises an emission frontside surface, and the electromagnetic radiation outlet is defined by an aperture at the emission frontside surface and/or by an emission monochromator optically coupled to the emission frontside surface.

15. A sample separation apparatus for separating a fluidic sample, the sample separation apparatus comprising:

a fluid drive configured to drive a mobile phase and the fluidic sample when injected in the mobile phase;

a sample separation unit configured to separate the fluidic sample in the mobile phase; and a detector comprising the flow cell according to claim 1 and configured to detect the separated fluidic sample.

16. The flow cell according to claim 1, comprising at least one of the following features:

wherein the cuvette comprises a straight-sided excitation frontside surface at which the electromagnetic radiation inlet is disposed;

wherein the cuvette comprises a straight-sided emission frontside surface at which the electromagnetic radiation outlet is disposed.

17. The flow cell according to claim 1, comprising at least one of the following features:

wherein at least part of the cuvette is formed by a plurality of thermally bonded cuboid elements;

wherein the cuvette is configured as a substantial cuboid body with a substantially cuboid hollow interior volume comprising the flow channel.

18. The flow cell according to claim 1, wherein the flow cell is configured so that a main propagation direction of the excitation electromagnetic radiation beam is substantially perpendicular to a main propagation direction of the emission electromagnetic radiation beam.

19. A method of detecting a fluidic sample separated by a sample separation apparatus, the method comprising:

enabling a flow of the separated fluidic sample through a flow channel formed at least partially in a cuvette;

coupling an excitation electromagnetic radiation beam into the cuvette via an electromagnetic radiation inlet; and coupling an emission electromagnetic radiation beam, generated by an interaction between the excitation electromagnetic radiation beam and the separated fluidic sample, out of the cuvette via an electromagnetic radiation outlet, wherein the cuvette has a configuration according to at least one of the following:

the cuvette comprises an excitation backside surface opposing the electromagnetic radiation inlet, and a geometry of the cuvette is configured so that at least one point at the excitation backside surface is outside of a direct field of view of the electromagnetic radiation outlet;

the cuvette comprises an emission backside surface opposing the electromagnetic radiation outlet, and a geometry of the cuvette is configured so that at least one edge at the emission backside surface is outside of a direct field of view of the electromagnetic radiation outlet.

20. The method according to claim 19, wherein the configuration of the cuvette comprises both of the following:

the cuvette comprises the excitation backside surface, and the geometry of the cuvette is configured so that the at least one point at the excitation backside surface is outside of the direct field of view of the electromagnetic radiation outlet; and the cuvette comprises the emission backside surface, and the geometry of the cuvette is configured so that the at least one edge at the emission backside surface is outside of the direct field of view of the electromagnetic radiation outlet.

* * * * *